H. A. MARTIN.
TICKET PRINTING MECHANISM.
APPLICATION FILED OCT. 9, 1916.

1,404,212.

Patented Jan. 24, 1922.
16 SHEETS—SHEET 1.

Inventor
HAAKON A. MARTIN
by R. C. Glenn
Earl Beust
Attorneys

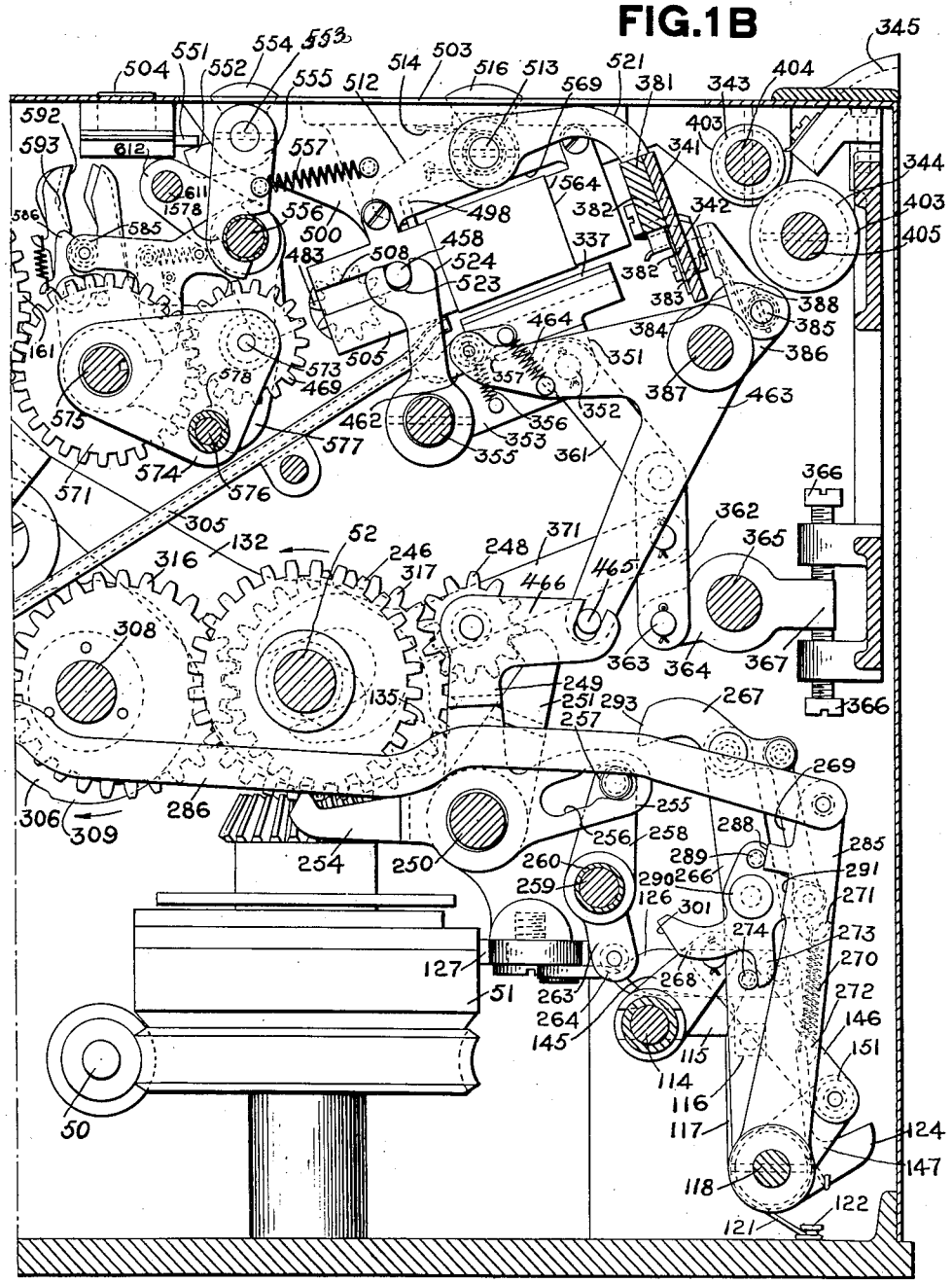

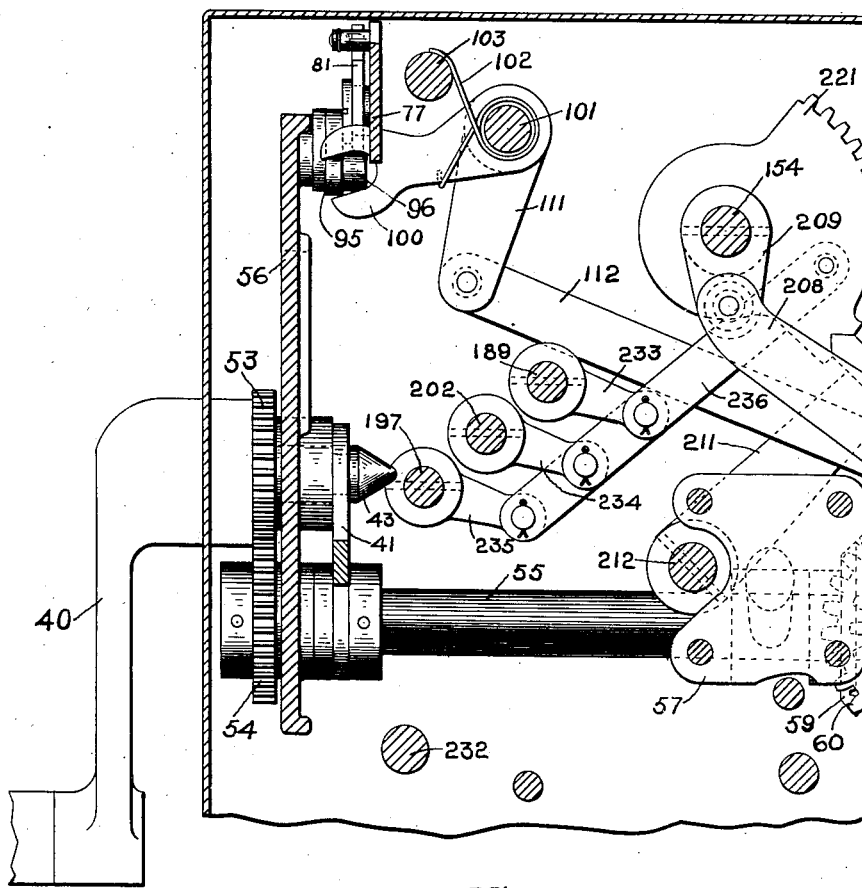
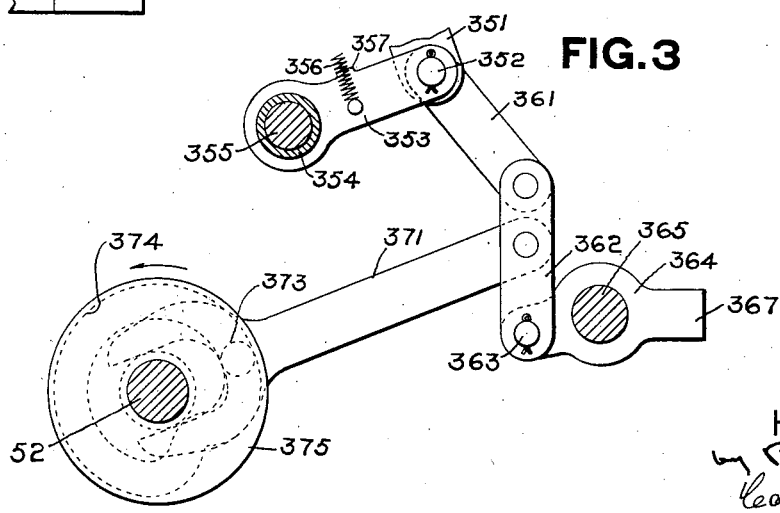

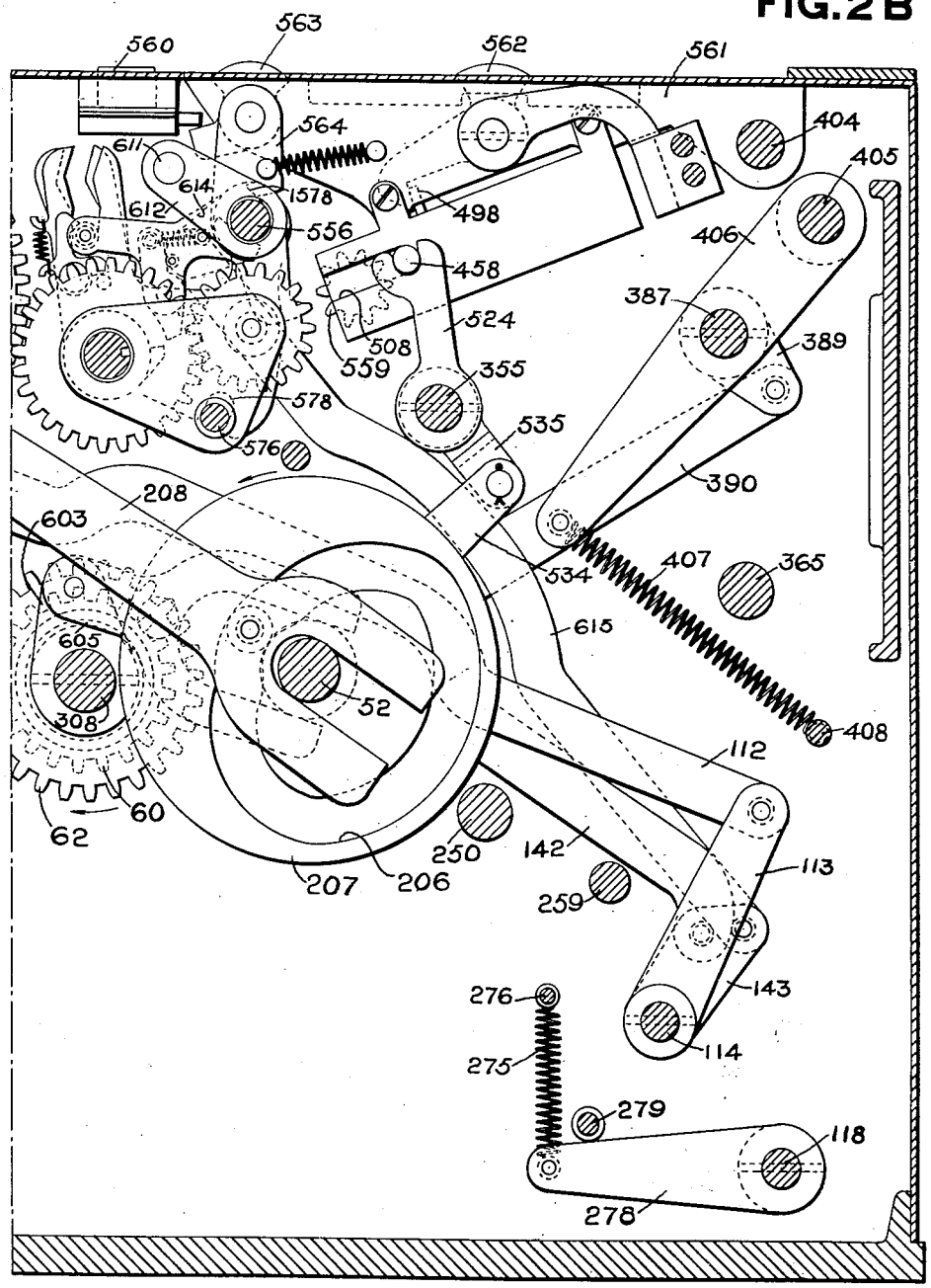

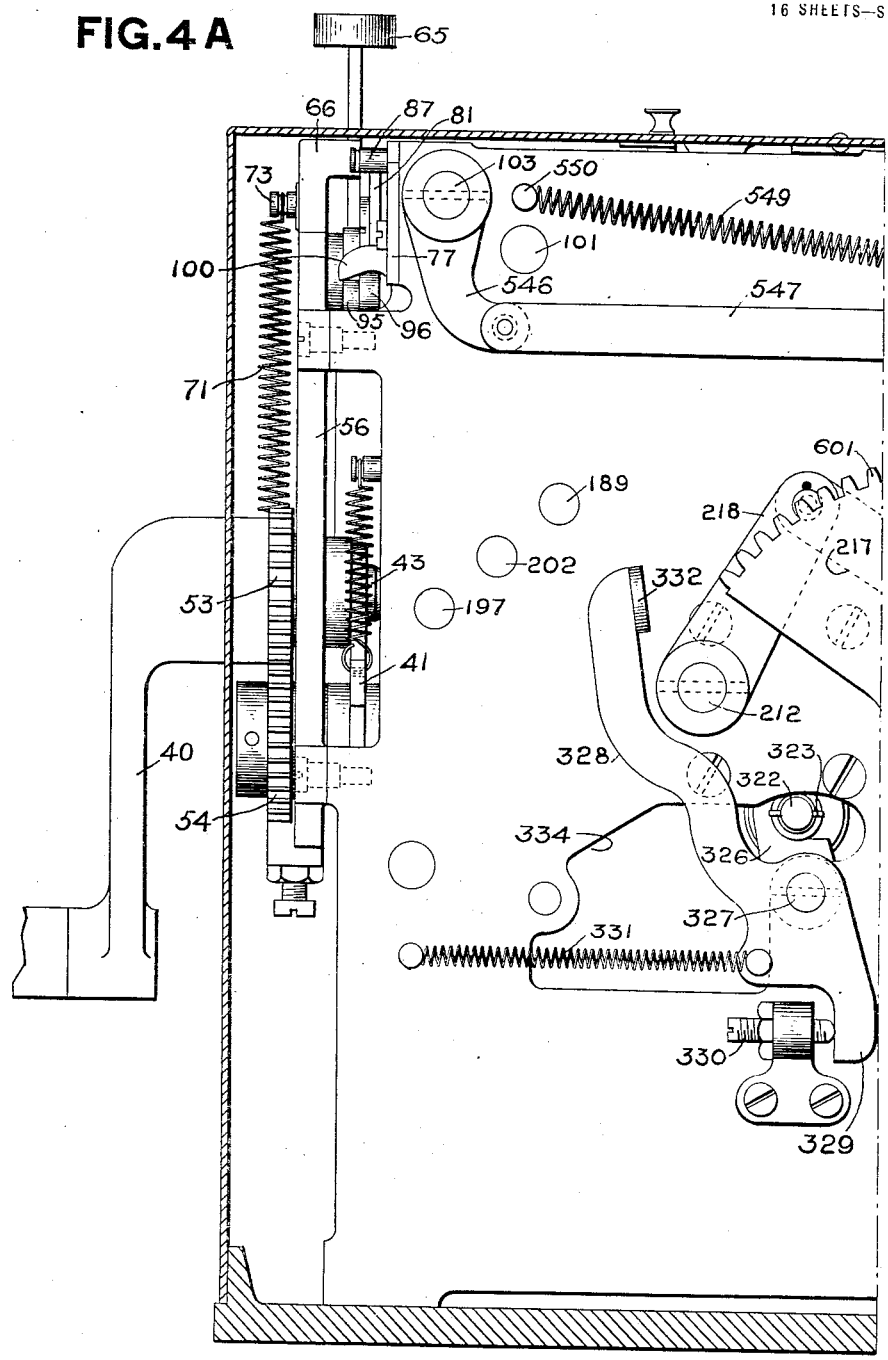

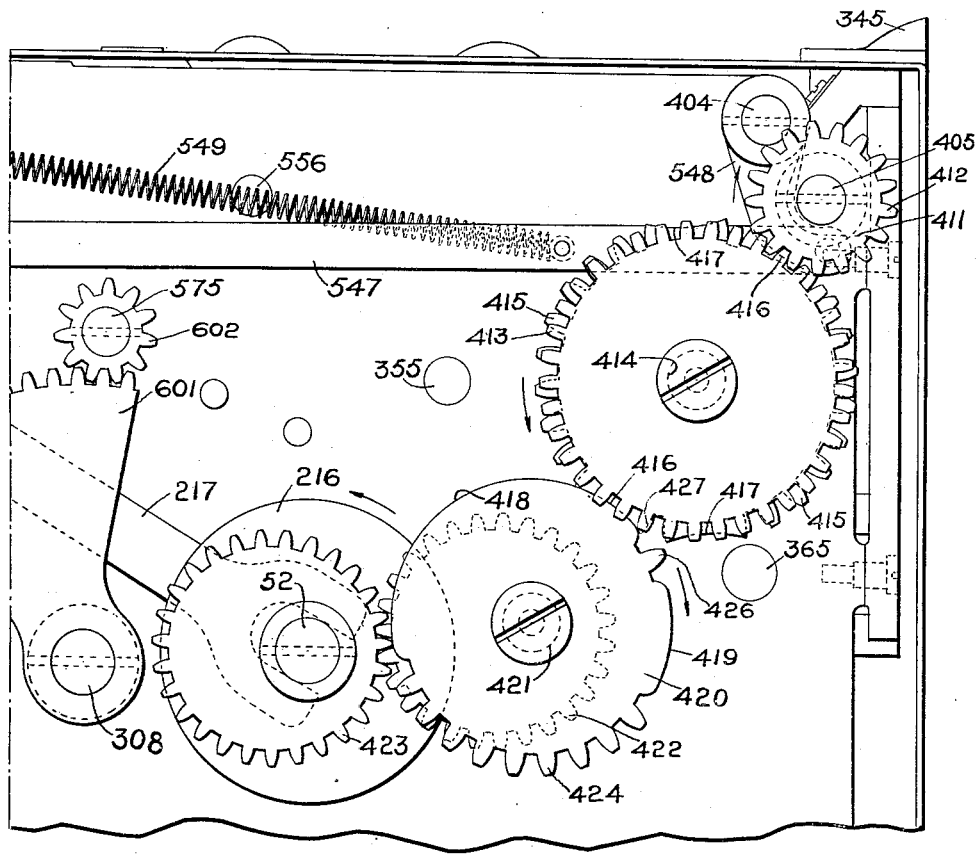
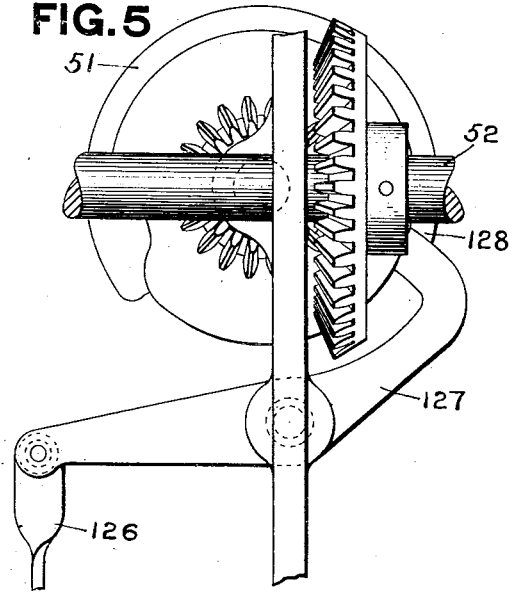
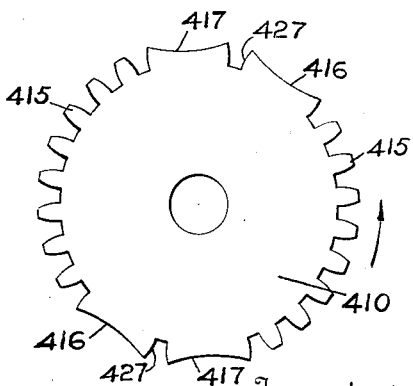

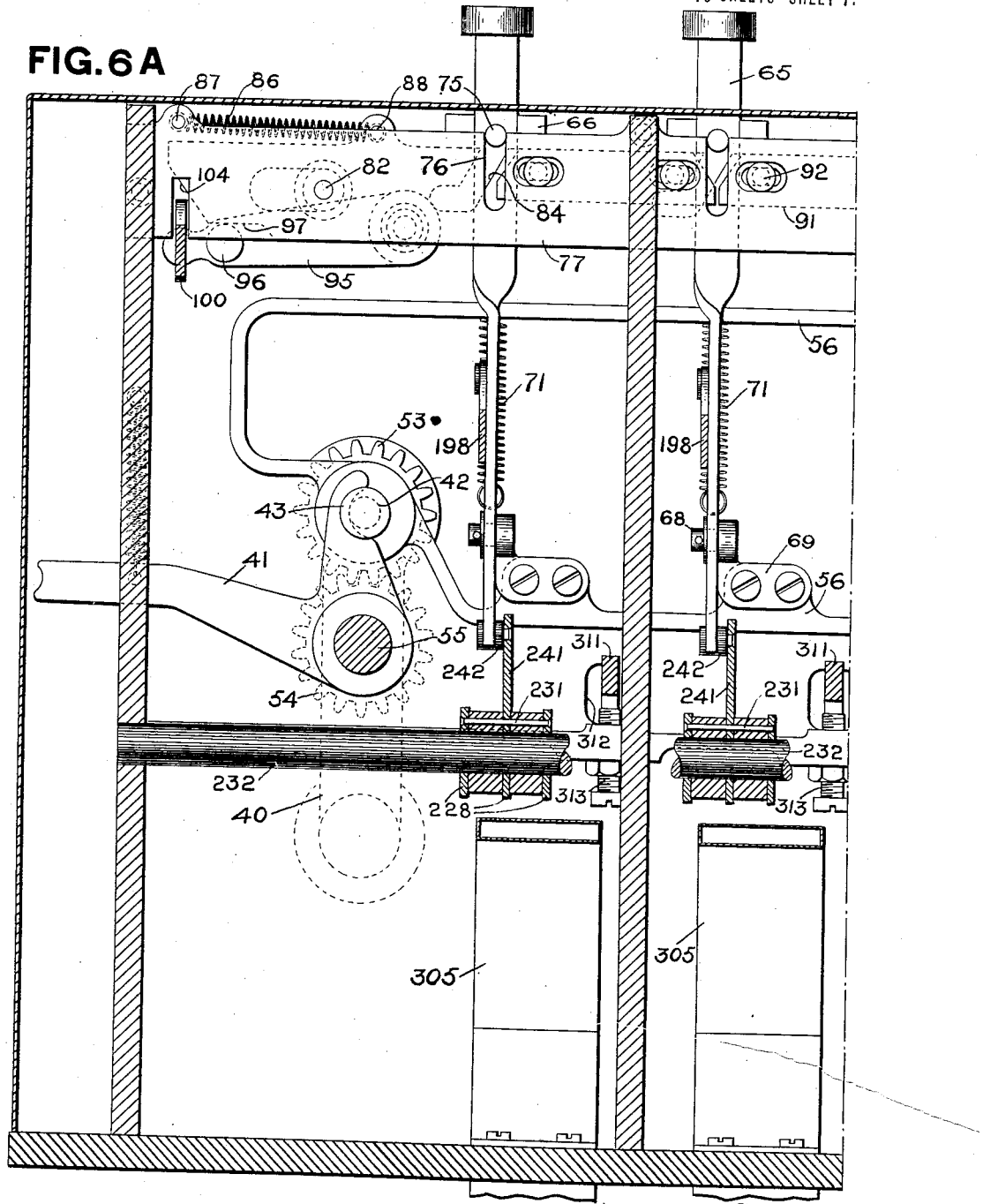

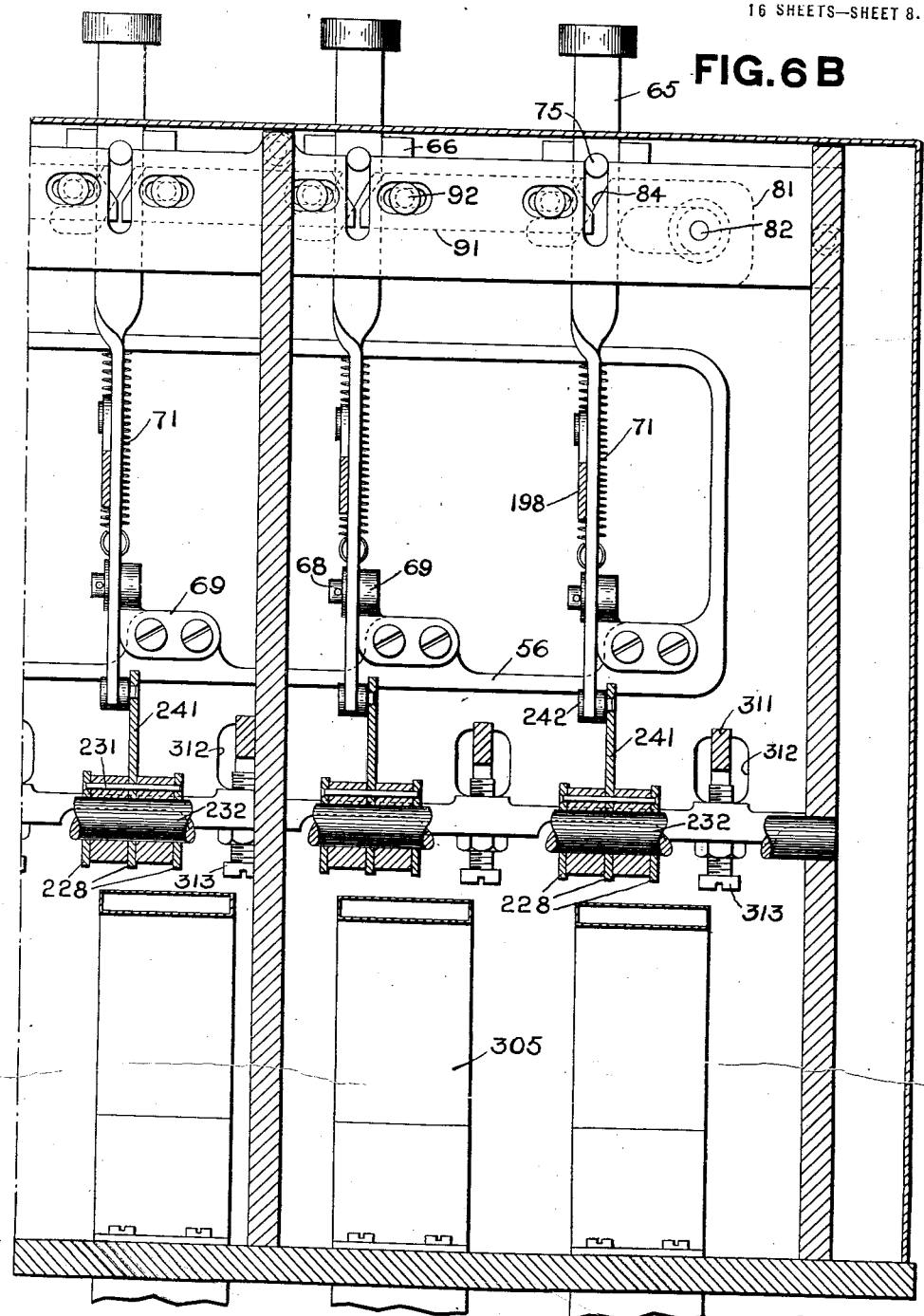

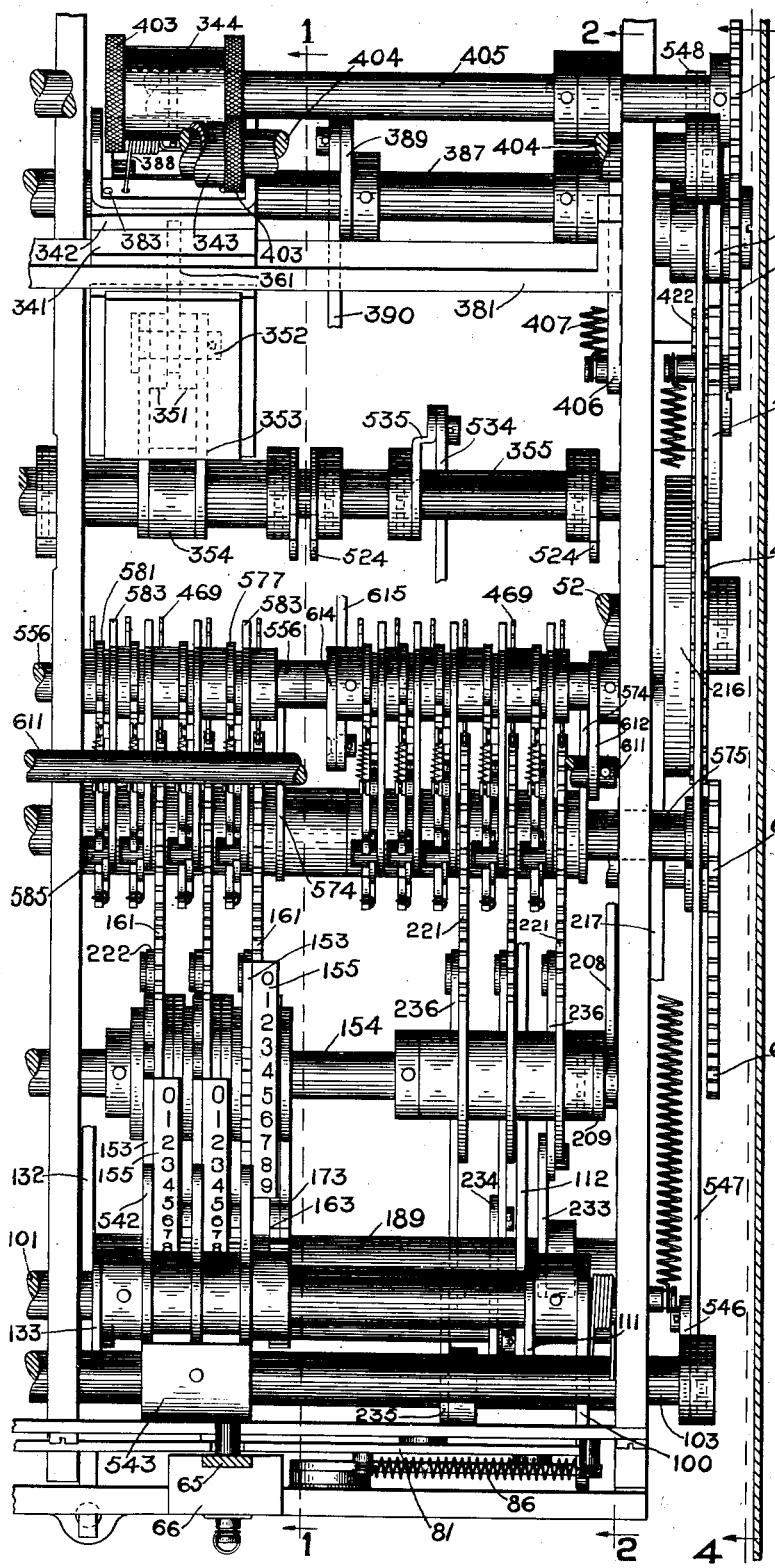

H. A. MARTIN.
TICKET PRINTING MECHANISM.
APPLICATION FILED OCT. 9, 1916.
1,404,212.
Patented Jan. 24, 1922.
16 SHEETS—SHEET 10.
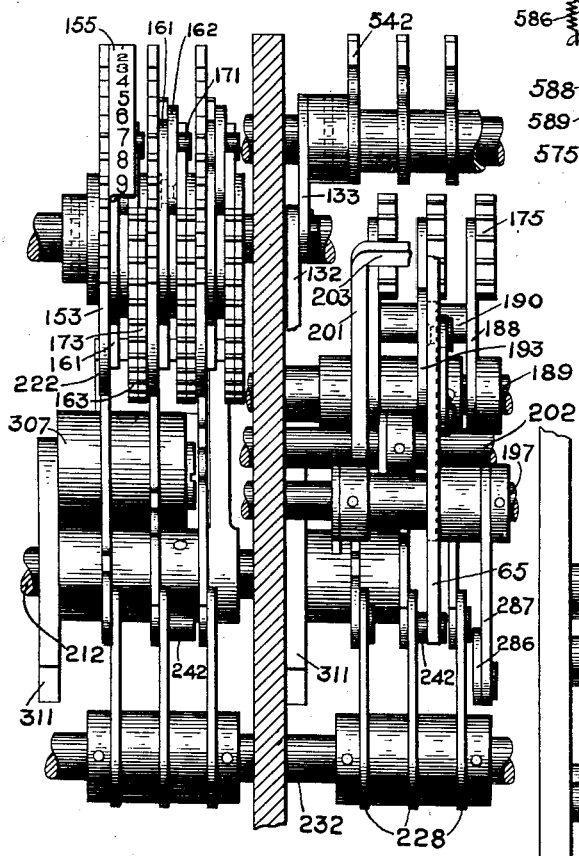
FIG. 9
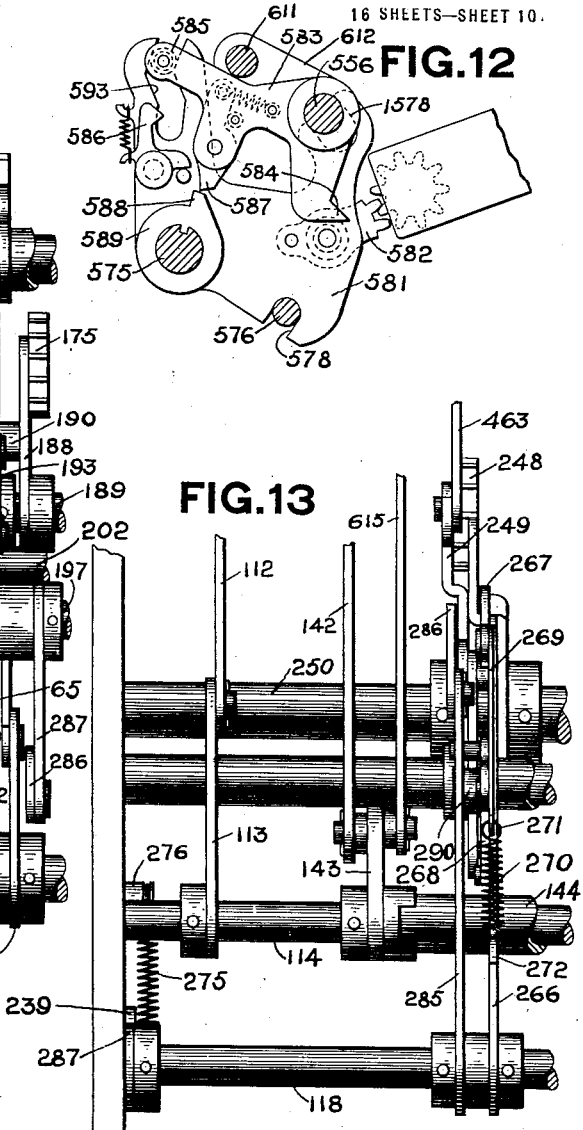
FIG. 12
FIG. 13
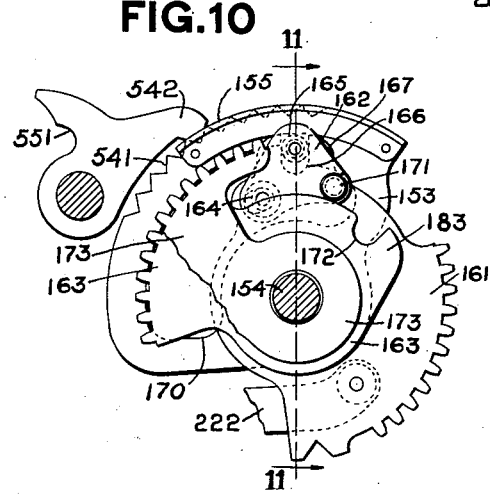
FIG. 10
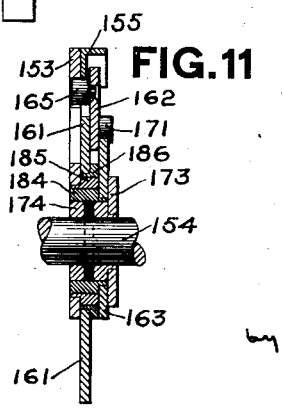
FIG. 11
Inventor
HAAKON A. MARTIN
by R. C. Sloan
Earl Benet
Attorneys

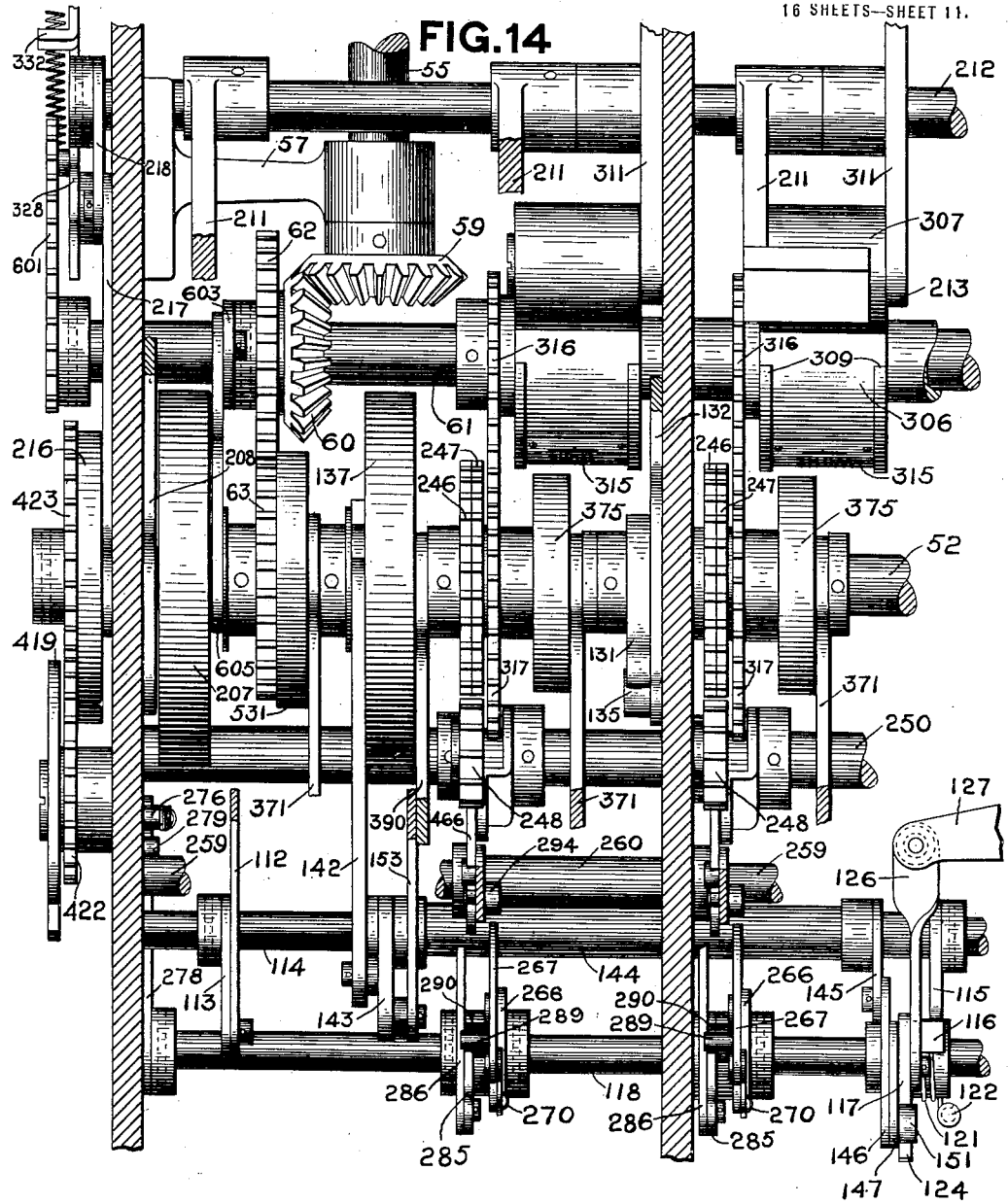

H. A. MARTIN.
TICKET PRINTING MECHANISM.
APPLICATION FILED OCT. 9, 1916.
1,404,212.
Patented Jan. 24, 1922.
16 SHEETS—SHEET 12.
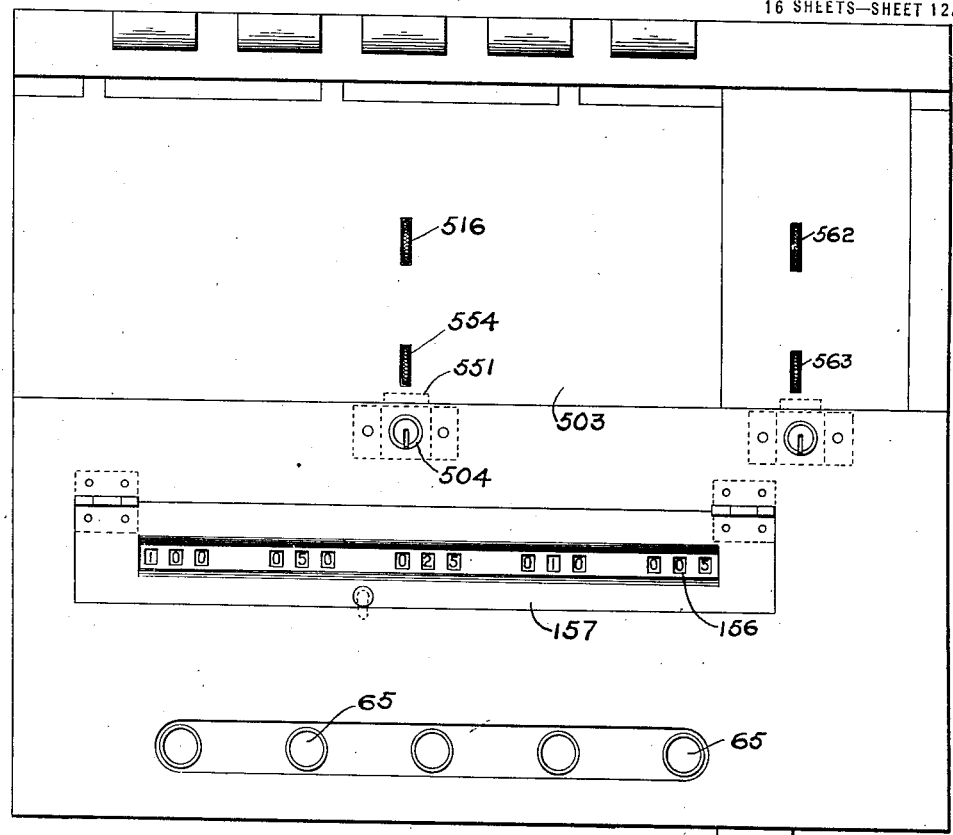
FIG.15
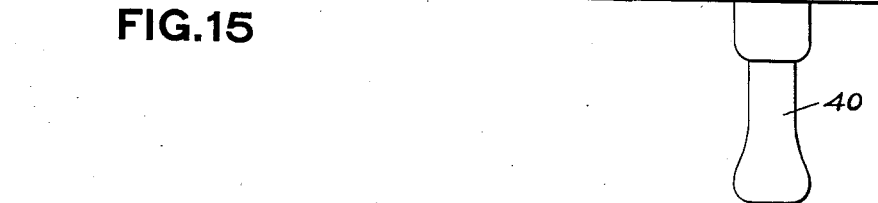
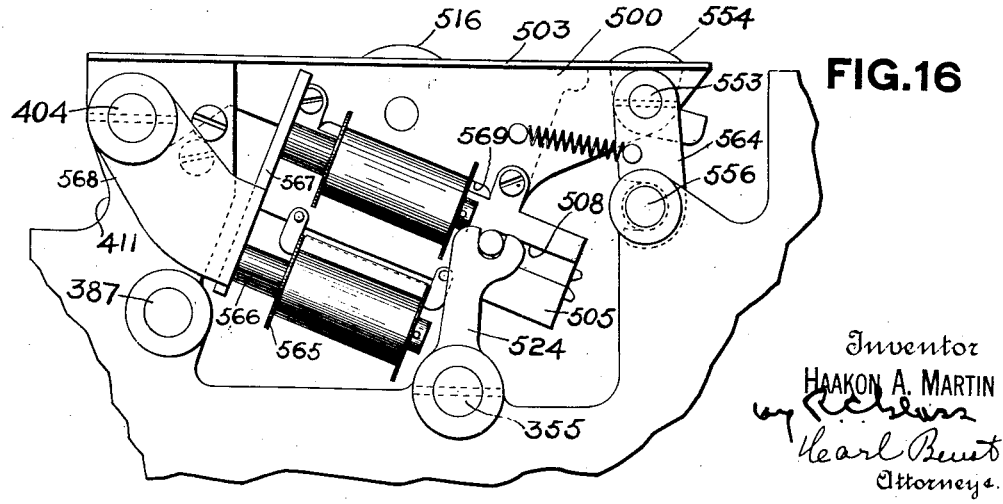
FIG.16
Inventor
HAAKON A. MARTIN
Attorneys

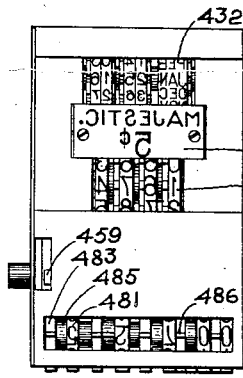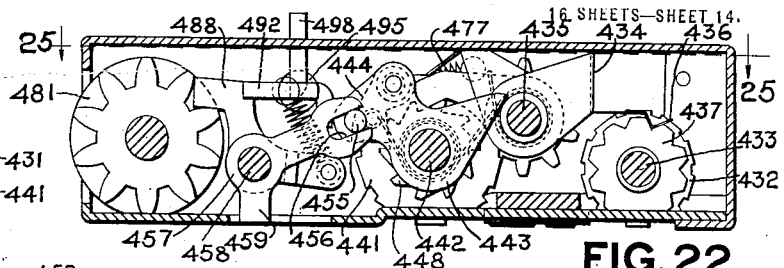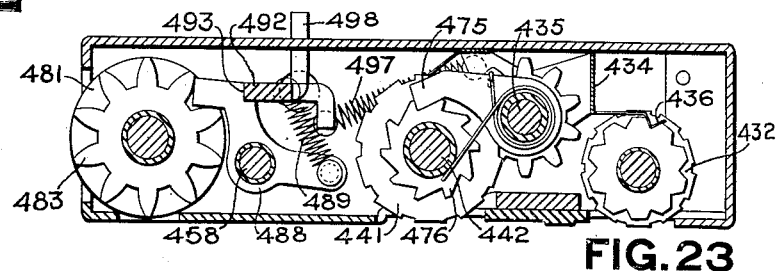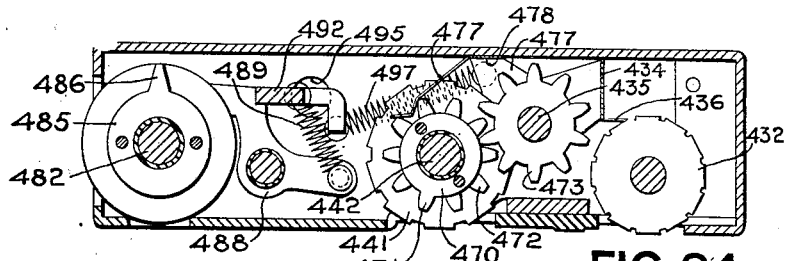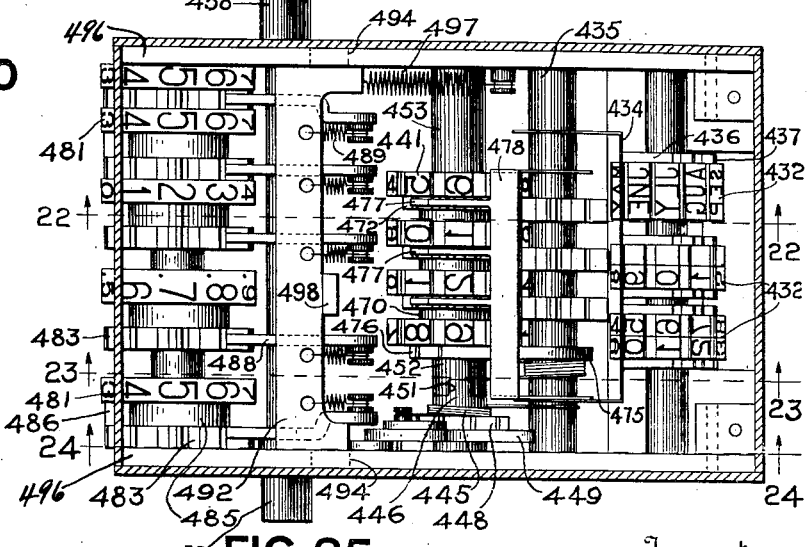

H. A. MARTIN.
TICKET PRINTING MECHANISM.
APPLICATION FILED OCT. 9, 1916.
1,404,212.
Patented Jan. 24, 1922.
16 SHEETS—SHEET 15.
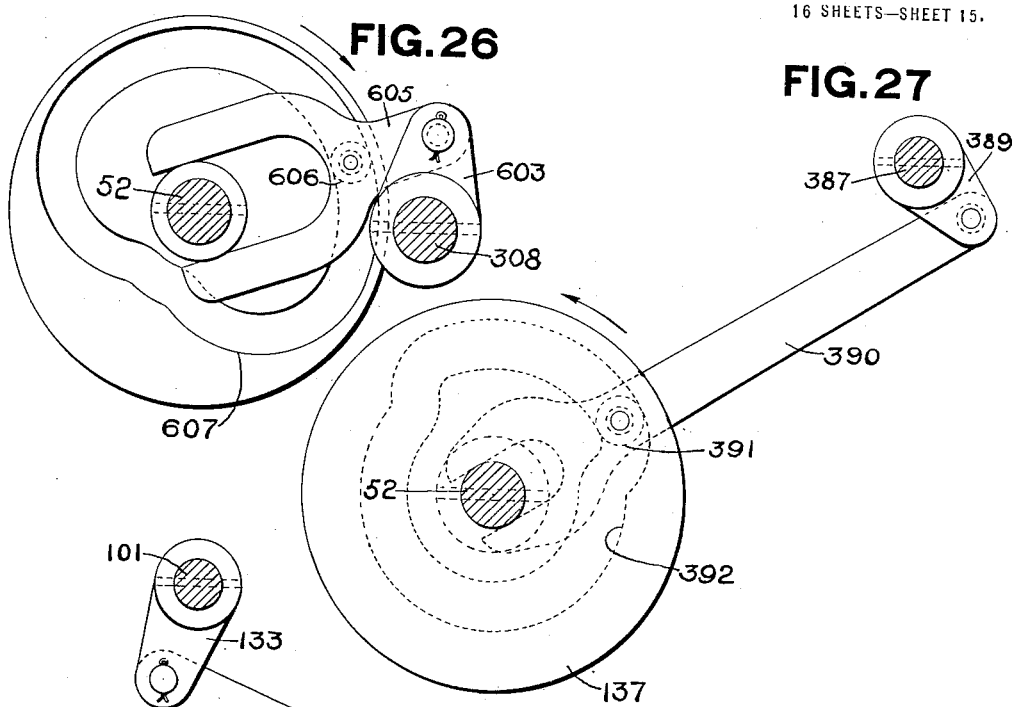
FIG. 26
FIG. 27
FIG. 28
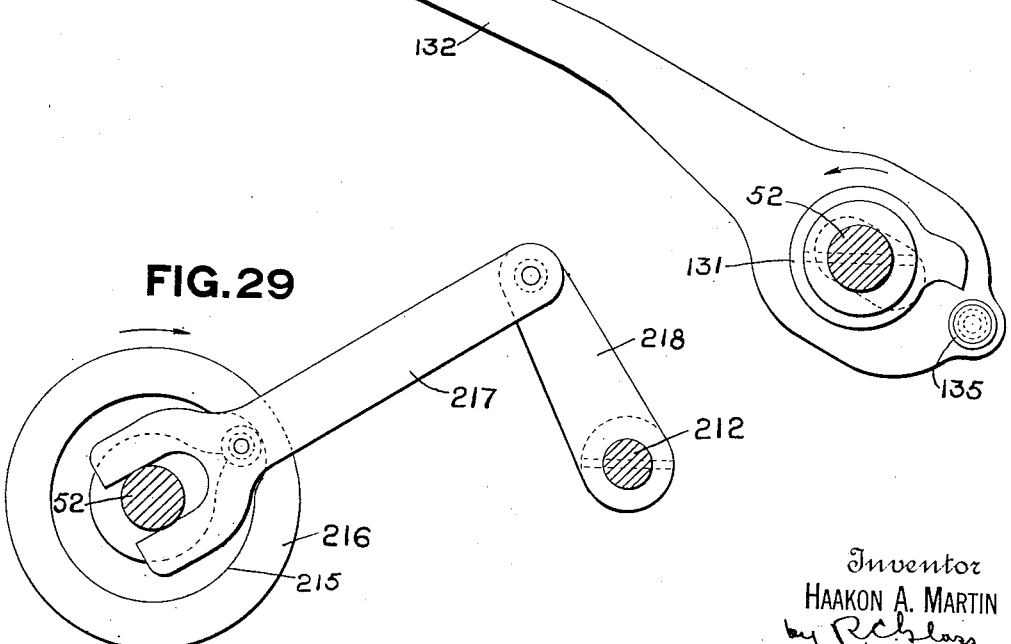
FIG. 29
Inventor
HAAKON A. MARTIN
Attorneys

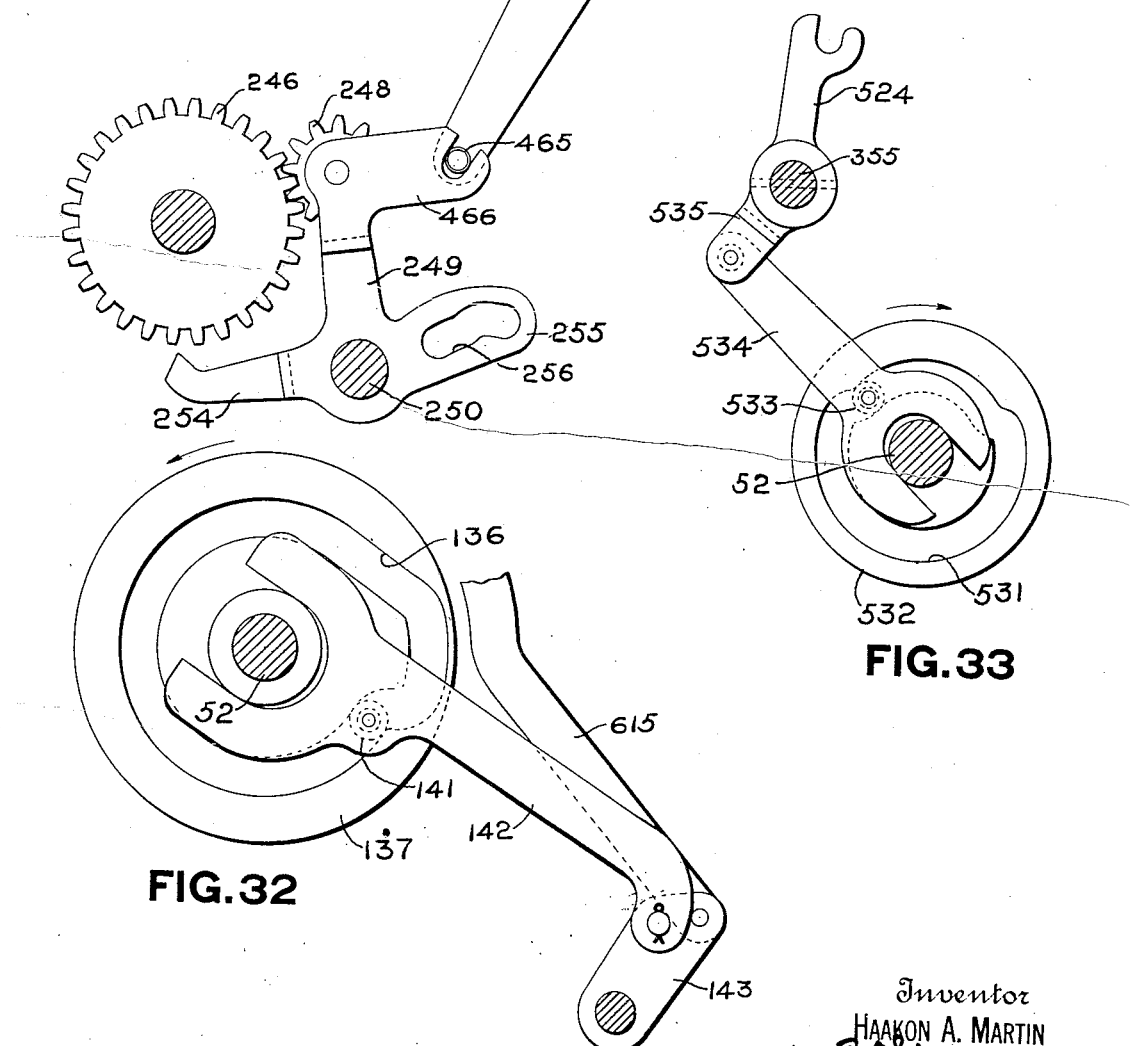

UNITED STATES PATENT OFFICE.

HAAKON A. MARTIN, OF DAYTON, OHIO, ASSIGNOR TO THE NATIONAL CASH REGISTER COMPANY, OF DAYTON, OHIO.

TICKET-PRINTING MECHANISM.

1,404,212.  Specification of Letters Patent.  Patented Jan. 24, 1922.

Application filed October 9, 1916. Serial No. 124,662.

*To all whom it may concern:*

Be it known that I, HAAKON A. MARTIN, a citizen of the United States, residing at Dayton, in the county of Montgomery and State of Ohio, have invented certain new and useful Improvements in Ticket-Printing Mechanism, of which I declare the following to be a full, clear, and exact description.

This invention relates to ticket issuing and accounting machines and has particular reference to machines of the kind constructed to print prices on the tickets as they are issued and add the amounts to previous totals.

The primary object of the invention is to provide a simple, compact machine of the kind mentioned which will be satisfactory for use in the ticket offices of theaters and similar places where different schedules of prices are in effect during different parts of the day or where the prices are changed from time to time according to the attractions offered. The machine is not limited to use in ticket offices, however, as it may be used with highly satisfactory results in any line of business where there is need for a machine to register and issue tickets or receipts for only a few different amounts.

More specifically, the object of the invention is to provide means whereby the machine may be quickly and easily prepared to print and add the new amounts when a change in prices goes into effect. This price changing mechanism comprises a number of novel features, all of which will be discussed fully later on. It is sufficient at this point to state that the advantage of the improved construction is its flexibility and the fact that it makes it possible to construct and prepare the machine to print and add an almost unlimited number of different prices.

Another object of the invention is to provide mechanism whereby it is possible to make a classified record of the sales made at each of the prices regardless of the number of different prices. This result is obtained by providing a record retaining device for each price, these devices in the present embodiment being in the form of interchangeable totalizers designed to be separately introduced into the machine and operated to add only when the corresponding price is printed on a ticket.

The inserted totalizers are driven by differentially operable actuators which are controlled by manipulative devices. When a change in prices goes into effect and the totalizer or totalizers for the new prices are inserted the manipulative devices are set to represent the new prices.

Another of the objects of the invention is to provide means for locking the manipulative devices in set position between operations. In the present embodiment, when one or more of the totalizers is inserted and in position to be engaged with the actuators the manipulative devices are locked against manipulation so that it is impossible to operate them to set up amounts different from the ones that the totalizers are intended to add.

Another object of the invention is to provide improved detachable devices for such machines, in connection with mechanism for operating record retaining devices in the detachable devices.

Another object of the invention is to provide improved mechanism for accumulating the total of the sales at all of the prices during any desired period. This mechanism comprises a number of interchangeable and insertible totalizers, one of which is inserted at the beginning and removed at the end of the period. This part of the invention has a broader aspect, however, as it involves a feature of construction capable of general use in accounting machines to be employed in places where there are only a few set prices in effect at a time, but where the prices are subject to change. As explained later, the improved construction provides a means whereby any one of several prices or amounts each consisting of several denominational orders may be added on the totalizer by operating a single key.

Still another object of the invention is to provide mechanism whereby in a machine constructed in sections any desired section may be connected to a common driving mechanism. The construction is such that it leaves the section last operated connected to the driving mechanism so that successive operations to issue tickets of the same class do not require shifting of the connecting devices for each of the operations.

With these and incidental objects in view, the invention consists in certain novel features of construction and combinations of parts, the essential elements of which are set forth in appended claims and a preferred form of embodiment of which is hereinafter described with reference to the drawings which accompany and form part of the specification.

Of said drawings:—

Figs. 1^A and 1^B are complementary parts of a section taken on the line 1—1 of Fig. 7, looking in the direction of the arrows.

Figs. 2^A and 2^B are complementary parts of a section taken on the line 2—2 of Fig. 7, looking in the direction of the arrows.

Fig. 3 is a detail of the cam and toggle actuated thereby to operate one of the ticket printing platens.

Figs. 4^A and 4^B are complementary parts of a section taken on the line 4—4 of Fig. 7, looking in the direction of the arrows.

Fig. 5 is a detail of some of the driving and controlling connections for the motor.

Figs. 6^A and 6^B are complementary parts of a section taken on the line 6—6 of Fig. 1^A.

Fig. 7 is a top plan view of mechanism at the right of the machine and shows, among other things, the connections between the right hand ticket section and the grand totalizer operating mechanism, also some of the driving connections.

Fig. 8 is a detail in top plan view of the devices for connecting one of the sets of differential devices to the common operating mechanism.

Fig. 9 is a front view of one of the sets of differential devices and some of the devices for connecting the set to the common operating mechanism.

Fig. 10 is a right side view of one of the totalizer actuators and mechanism for differentially controlling and operating it, the parts being shown in the positions they occupy at the end of an actuating stroke of the operating segment.

Fig. 11 is a section taken on the line 11—11 of Fig. 10, looking in the direction of the arrows.

Fig. 12 is a right side view of the transfer devices for one of the higher order totalizer elements with the parts shown in the positions they occupy when they have been operated to turn in transfers.

Fig. 13 is a rear view of mechanism for releasing the motor and for locking it at the end of an operation and mechanism whereby operation of a key clutches the corresponding ticket issuing mechanism to the common operating mechanism.

Fig. 14 is a top plan view, as viewed from the rear of the machine, of some of the driving devices and some of the mechanism controlled by the ticket keys.

Fig. 15 is a top plan view of the assembled machine.

Fig. 16 is a left side view of the frames carrying the inserted accounting devices and some of the parts immediately associated therewith.

Fig. 19 is a bottom plan view of one of the insertible ticket devices.

Figs. 20 and 21 show respectively the front and back of one of the tickets.

Fig. 22 is an enlargement of a section through one of the insertible ticket devices, the section being taken on the line 22—22 of Fig. 25, and looking in the direction of the arrows.

Fig. 23 is a section taken on the line 23—23 of Fig. 25, looking in the direction of the arrows.

Fig. 24 is a section taken on the line 24—24 of Fig. 25, looking in the direction of the arrows.

Fig. 25 is a section on the line 25—25 of Fig. 22, looking downward in the direction of the arrows.

Fig. 26 is a detail in left side elevation of the cam and pitman for operating tripped transfer devices to turn in transfers.

Fig. 27 is a detail in right side elevation of cam, pitman and some of the other connections for operating the ticket severing knives.

Fig. 28 is a detail of the cam and pitman for releasing the key detent.

Fig. 29 is a detail in left elevation of the cam and pitman for operating the locking or aligning devices for the totalizer actuators.

Fig. 30 is a detail of some of the connections whereby one of the ticket printing sections may be connected to the common driving mechanism with the casing of one of the insertible ticket devices broken away to show the operating connection for the consecutive numbering device carried in said insertible device.

Fig. 31 is a detail of one of the operating arms and connections actuated thereby for operating one of the consecutive numbering devices.

Fig. 32 is a detail of the cam for restoring operated tranfer and motor controlling devices to normal position.

Fig. 33 is a detail of the cam for engaging the totalizers in inserted devices with the totalizer actuators.

Fig. 34 is a detail of an intermittent gear forming part of the ticket ejecting mechanism.

Figure 1A:
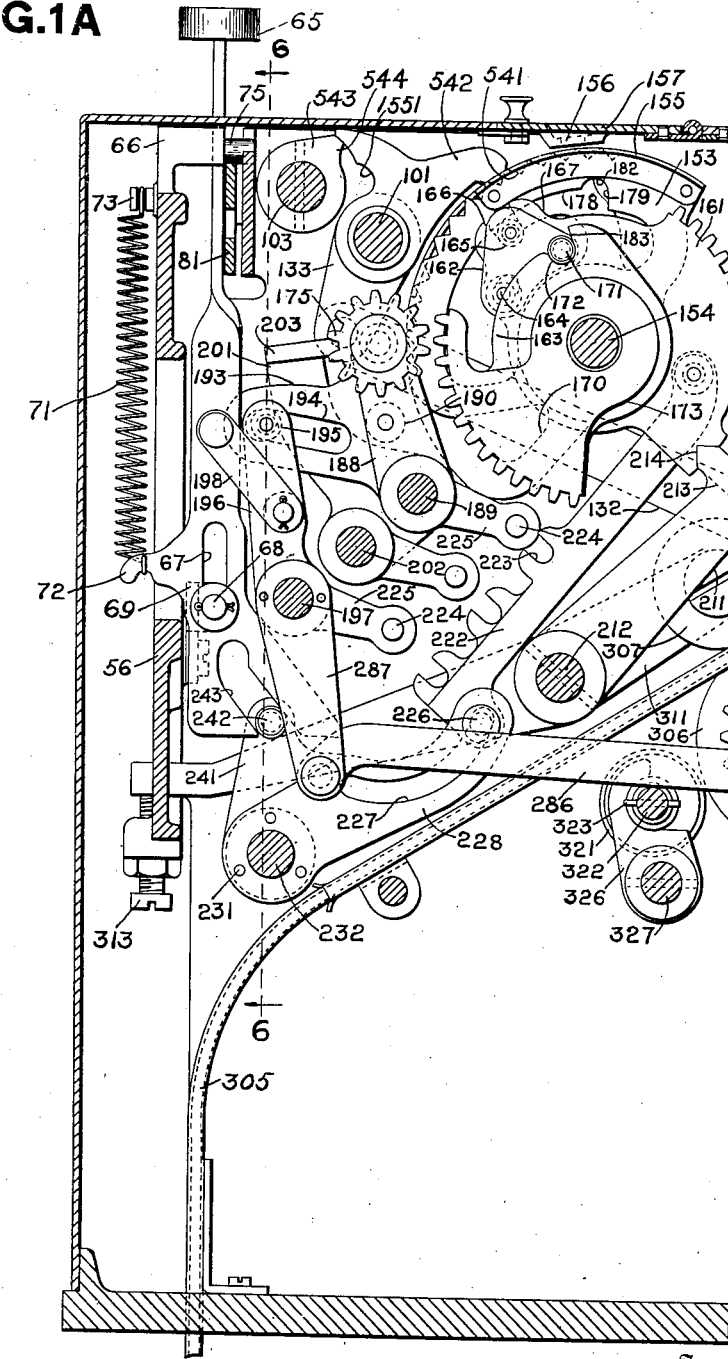

The machine in the drawings is constructed to issue and account for tickets of five different classes, although it may be altered to issue either a larger or smaller number of classes as desired. The mechanism comprises five sections, all of which are substantially alike. Common to the five sections are a driving mechanism and grand totalizer operating devices. For each of the sections, as shown, there is a depressible key which when depressed connects the mechanism of the appropriate section to the common driving mechanism and also establishes an operating connection between differential devices for that section and the operating devices for the grand totalizer.

Each of the five sections of the machine is constructed to receive devices inserted when preparing the machine to add certain prices. These devices are usually referred to herein as either the ticket or the accounting devices and they are described as being either insertible or inserted, depending upon whether they are in or out of the machine at the time they are mentioned. There may be any number of these devices supplied with the machine, one for each of the prices at which tickets are likely to be sold. Each device includes date printing type wheels, a type plate for printing on the tickets the price at which the tickets are sold and any other matter such as the name of a theater, a consecutive numbering device for printing serial numbers on the tickets, and a totalizer which is operated by mechanism in the machine.

The grand totalizers previously mentioned are also carried by insertible devices, but in the present embodiment the insertible grand totalizer devices are not provided with any of the type carriers mentioned above in connection with the ticket devices.

When the machine is operated to issue a ticket from one of the sections the accounting device which has been inserted in that section is engaged with the actuating mechanism and the amount printed from the price type is entered on the totalizer carried in the ticket device. At the same time the amount is entered on the inserted grand totalizer device. It is clear that the amount received from sales of tickets of any one class may be ascertained by referring to the totalizer in the ticket device for that class and that the total of all sales since the grand totalizer was inserted may be ascertained by reference to the grand totalizer.

For operating the totalizers in the inserted ticket devices, each of the five sections of the machine has three differentially operable actuators and for each of the actuators there is a differentially adjustable segment carrying a stop controlling the actuator. When preparing the machine for operation the ticket devices for the prices wanted are inserted in a pivoted frame and the segments adjusted manually until indicators thereon show the same amount as appears on the type plate attached to the device. The pivoted frame is then operated to introduce the ticket devices therein into the machine and this operates connections for locking the segments in adjusted position. This locking mechanism, therefore, prevents changing the amount that the machine is prepared to add until the machine is again opened to remove or change the ticket devices to print and account for tickets of other prices.

As previously stated, operating a key for one of the five sections connects the mechanism of that section to the common driving mechanism. This involves connecting the differential mechanism for the section to the driving mechanism so that only the totalizer actuators for that section will be operated and also involves connecting the corresponding ticket printing and severing mechanism to the driving mechanism. As regards the latter, the construction is such that the driving connection between the common driving mechanism and the operated printing and severing mechanism remains effective at the end of the operation so that the machine is ready to issue tickets of the same kind at the next operation without its being necessary to reestablish the operating connection. In the present construction this result is obtained by having the driving connections operated by the keys in such a way as not only to connect the desired section to the operating mechanism, but also to disconnect the section last operated. The details of the construction will be described later on, it being sufficient here to state that in this embodiment all of the work of connecting a section to the driving mechanism and disconnecting the section last operated is accomplished by the down stroke of the keys.

In addition to connecting the differential and printing mechanisms to the common driving mechanism, operation of a key also connects the selected actuators with the grand totalizer. This affords a means whereby a plurality of sets of actuators, each set being capable of adding an amount different from others, may be selectively operated to add the desired one of the amounts on the grand totalizer. Such a construction has great possibilities in places where there are only a few prices to be entered, as it makes it possible to provide a machine in which different amounts of several denominations each may be entered on the totalizer by pressing a single key to start the machine, instead of its first being necessary to adjust a set of manipulative devices to set up the amount to be entered before the machine is operated.

*Driving mechanism.*

The machine is arranged to be operated either by means of a motor or an operating handle. The motor, which is designed generally by the numeral 50 (Fig. 1$^B$), is of the type fully shown and described in U. S.

Letters Patent No. 1,144,418, issued June 29, 1915, to Chas. F. Kettering and Wm. A. Chryst. The present construction also employs operating connections and circuit controlling devices which are designated generally by the numeral 51 (Figs. 1^A and 5) and are fully shown and described in the patent just mentioned. The operating handle 40 (Figs. 2^A, 4^A and 6^A) is removably held by a spring operated bell crank 41, one arm of which engages an annular groove 42 in a pin 43 rigid with the handle. A gear 53 connected to the handle meshes with a gear 54 fastened to a shaft 55 journaled in a front cross frame 56 and a bracket 57 (Figs. 2^A and 14), attached to the right hand side frame of the machine. Fastened to the rear end of the shaft 55 is a bevel gear 59 meshing with a bevel gear 60 loose on a shaft 61. Rigid with the bevel gear 60 is a gear 62 meshing with a gear 63 fastened to the driving shaft 52. Operation of either the handle 40 or the motor 50 results in a complete rotation of the driving shaft. This shaft carries cams and gears for operating all of the mechanism that is not driven directly by operation of the keys.

*Manipulative devices.*

As previously stated in a general way, each of the five sections of the ticket mechanism has a key and a set of manually adjustable segments controlling the operation of the differential mechanism for that section. The five keys are designated by the numeral 65 (Figs. 1^A, 4^A and 6^A) and are all slidably mounted in extensions 66 formed on the upper edge of the front frame 56. At their lower ends the keys have slots 67 (Fig. 1^A) into which extend studs 68 formed on small brackets 69 (Figs. 1^A and 6^A) attached to the inner side of the front frame. The keys are depressible against the tension of springs 71 stretched between fingers 72 (Fig. 1^A) formed on the keys and pins 73 fastened to the frame 56. Each of the keys carries a pin 75 projecting toward the rear of the machine into vertical slots 76 (Figs. 6^A and 6^B) formed in a plate 77 extending the width of the machine and supported by the main machine frames.

When a key is depressed it is latched in depressed position until the operation of the machine is practically completed. This is accomplished by a latching or detent plate 81 (Figs. 1^A, 2^A, 6^A and 6^B) slidably mounted on studs 82 attached to the plate 77. The plate 81 has a slot 84 for each of the keys. As shown in the two figures last mentioned, each of these slots consists of two parts, an inclined part and a part which is horizontal. When a key is depressed its pin 75 will engage the inclined part of the slot 84 and shift the plate to the right (Figs. 6^A and 6^B) against the tension of a spring 86 stretched between a stud 87 attached to the plate 77 and a stud 88 fastened to the sliding plate 81. After the plate 81 has been moved a part of the distance by the key, motor releasing mechanism described later is permitted to operate and when the key pin 75 is at the bottom of the slot this mechanism shifts the plate 81 still further in the same direction to engage the horizontal portion of one of the slots 84 with the pin 75 of the key. This latches the operated key in depressed position until the motor releasing mechanism is restored, whereupon the horizontal portion of the slot 84 is disengaged from the pin 75 and the key is then returned to its original or undepressed position by its spring 71.

When the plate 81 is in latching position its upper edge will, of course, be under the pins 75 of the undepressed keys, thereby preventing operation of a second key until the first is released. However, owing to the fact that the slots 84 are all of the same inclination it is also necessary to provide means to prevent simultaneous operation of two or more keys. This is accomplished by four plates 91 (Figs. 6^A and 6^B) slidably supported by studs 92 engaging slots in the plates 77. The slots are only long enough to permit a limited endwise movement of the plates 91. All of the plates 91 are beveled at their ends and when a key is depressed its pin 75 will engage the beveled ends of the plates and separate them far enough to accommodate the pin. The pin will then hold the plates against movement if an attempt is made to press a second key, as the construction is such that only one of the pins 75 can pass between the plates at a time.

The motor releasing mechanism above mentioned comprises an arm 95 (Figs. 2^A, 6^A and 7) pivoted to the front machine frame 56 and having a stud 96 engaging the lower edge of the sliding detent plate 81 at 97 where said plate is slightly cut away as shown. The arm 95 has a rounded end engaging a slot in the forward end of an arm 100 fastened to a shaft 101. A spring 102 wound around the shaft has one end bent around the arm 100 and the other engaging a rock shaft 103, the spring tending at all times to swing the arm 100 clockwise (Fig. 2^A). When a key is partially depressed the sliding plate 81 will be shifted far enough to bring an inclined portion 104 at the end of the plate above the stud 96. As soon as this occurs the spring 102 is free to act through the arms 100 and 95 and the stud 96 cooperating with the inclined edge 104 to shift the plate 81 still further in the same direction to engage the horizontal portion of one of the slots 84 with the pin 75 in the depressed key and latch the key in depressed position. It is apparent, of course, that in order to do this the spring 102 must be superior to the spring 86.

The spring 102 not only operates the connections just described to latch the keys in depressed position, but it also operates through other connections to release the motor and close the electrical circuit through the motor. The connections last mentioned comprise an arm 111 rigid with the arm 100 and a link 112 (Figs. 2ᴬ and 2ᴮ) connecting the arm 111 to an arm 113 fastened to a rock shaft 114. Fastened to the shaft 114 is also an arm 115 (Figs. 1ᴮ and 14) which is normally in engagement with a squared stud 116 attached to the side of an arm 117 loosely mounted on a rock shaft 118. Wound around the hub of the arm 117 is a torsion spring 121 having one end engaging a pin 122 in the machine base and the other end bent around the under edge of a projection 124 of the arm 117. The spring 121 is so tensioned that it at all times tends to rock the arm 117 counter-clockwise (Fig. 1ᴮ).

Pivoted to the upper end of the arm 117 is a twisted link 126 (see also Figs. 5 and 14) the other end of which is pivoted to a bell crank 127 pivoted to the lower edge of one of the intermediate machine frames. The nose of the bell crank 127 is normally in engagement with a shoulder 128 of the motor connecting and circuit controlling mechanism. By following the movement through the various parts just described it will be seen that when a key is depressed and the arms 100 and 111 rocked by the spring 102 the link 112 will be drawn forward, thereby rocking the shaft 114 to withdraw the arm 115 from engagement with the stud 116. The spring 121 will then rock the arm 117 counter clockwise (Fig. 1ᴮ) and this, through the link 126, will swing the bell crank 127 out of engagement with the shoulder 128 to release the motor and circuit controlling mechanism. When the depressed key is released near the end of the operation all of the other parts referred to are returned to the positions in which they are shown, the bell crank 127 being released for restoration to the position when it will again engage the shoulder 128 to disconnect the motor from the driving mechanism and break the electrical circuit through the motor.

The key is released and the detent plate 81 restored to normal condition by a cam 131 (Figs. 14 and 28) fastened to the driving shaft 52. Slidably mounted on the shaft 52 is a pitman 132 (Figs. 1ᴬ, 1ᴮ and 28) pivoted at its forward end to an arm 133 fastened to the rock shaft 101. When a key is depressed and the arms 100 and 111 rocked as previously described to latch a key in and release the motor, the pitman 132 is drawn forward so that a roller 135 attached thereto is brought into engagement with the periphery of the cam 131. Near the end of the operation the cam 131 acts against the roller 135 to thrust the pitman 132 rearward and this rocks the shaft 101 and the arms 100 and 111 (Fig. 2ᴬ) back to their original positions and again tensions the spring 102. As the arm 100 returns to its original position the arm 95 (Fig. 6ᴬ) and stud 96 are carried down to the positions shown and the spring 86 is then permitted to return the detent plate 81 to its normal position, aided by the spring 71 of the depressed key when the inclined portion of the appropriate slot 84 reaches the pin 75 of said key.

When the shaft 101 is rocked by action of the cam 131 the link 112 is, of course, thrust rearward to its original position and this rocks the shaft 114 to return the arm 115 to its normal position. Before the arm 115 can be restored, however, it is necessary to swing the arm 117 (Fig. 1ᴮ) rearward far enough to prevent the stud 116 thereon from interfering with the restoring movement of the arm 115. This is effected by a cam groove 136 (Fig. 32) in the side of a disk 137 fastened to the driving shaft 52. Engaging the cam groove 136 is a roller 141 on the side of a pitman 142. The pitman 142 is pivoted at its rear end to an arm 143 fastened to a sleeve 144 (Figs. 13 and 14) loose on the shaft 114. At its other end the sleeve 144 carries an arm 145 (Fig. 1ᴮ) connected by a link 146 to an arm 147 loosely mounted on the shaft 118. The shape of the cam groove 136 is such that before the cam 131 releases the keys the pitman 142 is thrust rearward, thereby causing an enlarged head 151 of the rivet forming the connection between the link 146 and the arm 147 to engage the projection 124 on the arm 117 and carry the arm clockwise (Fig. 1ᴮ) against the tension of the spring 121 far enough to prevent any interference between the stud 116 and the arm 115. After the arm 115 has been restored to normal position the arm 117 is permitted to move forward slightly so as to engage the stud 116 with the end of the arm 115.

*Differential mechanism.*

In addition to the five keys 65, the machine has five sets of manipulative devices, each set controlling the adding mechanism for its particular section. There are three manipulative devices in each set, all of them being in the form of segments 153 (Figs. 1ᴬ, 7, 9 and 10) loosely mounted on a rock shaft 154. These segments are intended to be adjusted manually to set up the amounts to be added and carry indicators 155 which are visible through openings 156 (Figs. 1ᴬ and 15) in a lid 157 hinged to the top of the casing. The segments 153 are normally locked against movement and are unlocked as a preliminary to changing the prices so that they may be freely adjusted to set up the desired amounts. The locking mechanism and the manner in which it is controlled will be described in detail later.

Each of the manually adjustable segments 153 controls the movements of a totalizer actuator 161 (Figs. 1A, 8, 9, 10 and 11). These actuators are normally connected by means of latching plates 162 to operating segments 163 which may be connected to the driving mechanism as hereinafter described. The latching plates 162 are substantially triangular in shape and have slot and pin connections 164 with the actuators 161. The slot and pin connections form pivots for the latching plates 162 and also permit the plates to shift slightly at an angle to the radius of the actuators. Rollers 165 carried by the latching plates 162 are at all times in engagement with open slots 166 in extensions of the actuators 161 and project into openings 170 (Figs. 1A and 10) in the segments 153. Rollers 171 also carried by the latching plates are normally in engagement with notches 172 in the segments 163.

Adjacent each of the segments 163 is a segment 173 having rack teeth coinciding exactly with those of segments 163 and having its hub 174 (Figs. 8, 9 and 11) fastened to the rock shaft 154. When a key 65 is depressed broad tooth pinions 175 are swung into engagement with the teeth of the three pairs of segments 163 and 173 corresponding to the key operated. Then when the shaft 154 is given its rocking movement the pairs of segments 163 and 173 will be oscillated as a unit. This, because of the engagement of the rollers 171 on the latching or connecting plates 162 with the notches 172 in the segments 163, will cause the actuators 161 to be carried along, the rollers 171 being held in engagement with the notches 172 because of the fact that the rollers 165 are in engagement with the curved inner edges 178 (Fig. 1A) of the openings 170 in the segments 153. When the actuators have been carried up the proper distance to register the amount represented by the positions of the segments 153 the rollers 165 will strike shoulders 179 formed in the openings 170 in the segments 153 and the plates 162 will be rocked counter-clockwise (Figs. 1A and 10) to carry the rollers 165 up into notches 182 in the segments 153. This, of course, will withdraw the rollers 171 from engagement with the notches 172 in the segments 163 so that the rest of the movement of the segments will be an idle movement. The position of the parts at the end of this idle movement or stroke of the segments 163 is shown in Fig. 10 which shows an actuator disconnected and latched at the "5" position. When the shaft 154 is rocked back to its original position a shoulder 183 on the segment 163 will strike the roller 171 and start the actuator back to its zero position. As it starts back the notch 182 will cooperate with the roller 165 to again seat the roller 171 in the notch 172 and it will then be held in engagement during the return of the actuator by the curved inner edge 178 of the opening 170 in the segment 153.

It is clear that in order to make the mechanism compact it is desirable to bring the various operating and controlling devices associated with each actuator in as close relationship with the actuator as possible. This is done by nesting hubs as shown in Figs. 8 and 11. As previously stated, and as shown in the figures just mentioned, the hubs 174 for the segments 173 are fastened to the shaft 154. Rotatably mounted on each hub 174 is the hub 184 of the segment 163 and loosely mounted on the hub 184 is the hub 185 of the manually adjustable segment 153. The hub 185 of the segment 153 in turn forms a bearing for the hub 186 of the actuator 161.

The broad tooth pinions for connecting the segments 163 and 173 are carried by arms 188 (Figs. 1A and 9). The three arms 188 for each section of the machine are fastened together by rods 190 to form rigid units loosely mounted on a rock shaft 189.
The middle arm 188 of each of the groups has a forwardly extending portion 193 in which there is a slot 194 surrounding a roller 195 carried by an arm 196 loose on a rock shaft 197. The arms 196 are connected by links 198 to the stems of the keys 65 for their respective sections. When a key is depressed its link 198 will throw the upper end of the arm 196 rearward and this will rock the three arms 188 rearward to engage the broad tooth pinions 175 with the corresponding three pairs of segments 163 and 173. When the key is released and returned to outer position by its spring 71 this operation of the parts is reversed and the broad tooth pinions are withdrawn from engagement to disconnect the differential mechanism from the driving mechanism.

In order to maintain the broad tooth pinions 175 in proper relation with the teeth of the segments 163 and 173 when they are out of mesh with the segments an aligning or locking element is provided for each set of pinions. These elements consist of the arms or plates 201 rigidly supported by the shaft 189 and a shaft 202 and blades 203 extending laterally from the arms. The blades 203 are long enough to engage all three pinions of their respective sets. As the pinions are carried out of mesh with their segments the teeth of the pinions are engaged with the blades of the aligning elements and the pinions are then held against rotation until they are again engaged with their segments.

The rock shaft 154 is given its rocking movement to operate the actuators 161 by a cam groove 206 (Fig. 2<sup>B</sup>) in the side of a disk 207 fastened to the driving shaft 52. Cooperating with the cam groove 206 is a pitman 208 (Figs. 2<sup>A</sup> and 2<sup>B</sup>) pivotally connected to an arm 209 fast to the rock shaft 154. The shape of the cam groove is such that shortly after the driving shaft 52 begins to turn, the shaft 154 and, of course, all of the segments fastened thereto are rocked clockwise (Figs. 1<sup>A</sup> and 2<sup>A</sup>) and held in rocked position for approximately one third of the rotation of the driving shaft. The shaft 154 and segments 173 are then returned to their original positions. The first or clockwise movement of the shaft differentially operates the actuators 161 and drives the totalizer in the desired ticket device and the return movement of the shaft restores the actuators to their normal or zero positions.

The actuators 161 are all normally locked against movement by aligning devices consisting of arms 211 (Figs. 1<sup>A</sup> and 14) attached to a rock shaft 212 and carrying laterally extending blades 213 long enough to engage the notches 214 in the rear edges of the respective sets of actuators. The shaft 212 is rocked at the beginning of an operation to release the actuators by a cam groove 215 (Fig. 29) in the side of a disk 216 (Figs. 4<sup>B</sup> and 14) fastened to the driving shaft 52. As soon as the shaft 52 begins to turn the cam 216 actuates a pitman 217 and arm 218 fastened to the rock shaft 212 to swing the aligning blades 213 out of engagement with the actuators 161 and hold the former out of engagement until just before the rotation of the shaft is completed.

In addition to throwing the broad tooth pinions into engagement to connect the corresponding set of actuators to the driving mechanism, depression of a key also establishes a driving connection between the selected set of actuators 161 and a set of actuators 221 (Figs. 2<sup>A</sup> and 7) for operating an inserted grand totalizer. For this purpose each of the actuators 161 has pivoted thereto one end of a link 222 (Fig. 1<sup>A</sup>). These links are provided with notches 223 to engage studs 224 carried by arms 225 fastened to the rock shafts 189, 202 and 197. At their lower ends each of the links 222 is provided with a stud 226 engaging a curved slot 227 in one of a series of three rearwardly extending arms 228. The three arms 228 for each section are fastened together by pins 231 (see also Figs. 6<sup>A</sup> and 6<sup>B</sup>) so as to form a unit loosely mounted on a rod 232 extending the width of the machine. Fastened to the right hand ends of the shafts 189, 202 and 197 are arms 233, 234 and 235 (Fig. 2<sup>A</sup>) connected respectively by links 236 to the units of cents, tens of cents and dollars actuators 221 for the grand totalizer.

Integral with the middle arm 228 of each set is an upwardly extending portion 241 (Fig. 1<sup>A</sup>) carrying a roller 242 projecting into an inclined slot 243 in the lower end of the associated key 65. When a key is depressed the slot 243 will cooperate with the roller 242 to rock the three arms 228 counterclockwise (Fig. 1<sup>A</sup>) thereby engaging the notches 223 with the studs 224. Then when the actuators 161 are differentially operated to enter an amount on the ticket totalizer the links 222 will transmit the differential movement to the rock shafts 189, 202 and 197 and thereby effect differential operation of the grand totalizer actuators 221. As a result the amount entered on the ticket totalizer will be entered on the grand totalizer.

*Ticket issuing mechanism.*

When the differential mechanism for a section of the machine is connected to the driving mechanism by operation of a key 65 the corresponding ticket printing and issuing mechanism is also connected to the driving mechanism. The devices whereby this connection is established and the ticket printing and issuing mechanism will be described next for the reason that the connections for moving the inserted accounting devices to carry their totalizers in and out of engagement with the actuating mechanism are actuated by the printing and issuing mechanism.

Each of the five sections of the machine comprises a gear 246 (Figs. 1<sup>B</sup> and 14) fastened to the driving shaft 52. Adjacent each gear 246 is a gear 247 of equal size and pitch loosely mounted on the shaft 52. When a section is to be operated the corresponding gears 246 and 247 are clutched together by broad tooth pinions 248 rotatably mounted on elements 249 loosely mounted on a rod 250 and normally held against rotation by aligning arms 251 fastened to the rod 250. The elements 249 have formed thereon arms 254 normally engaging the loose gears 247 to prevent the gears from being accidentally displaced during operations of the machine. Each element 249 also has a rearwardly extending arm 255 having a peculiarly formed cam slot 256 surrounding a roller 257 carried by an arm 258 loosely mounted on a rod 259. Sleeves 260 on the rod 259 prevent the arms 258 from being displaced laterally on the rod. Rigid with each of the arms 258 is a downwardly extending arm 263 carrying an antifriction roller 264.

For each pair of arms 258 and 263 there is provided an arm 266 (Figs. 1<sup>B</sup>, 13 and 14) fastened to the rock shaft 118. Pivoted to the side of each arm 266 are pawls 267 and 268 connected for unitary movement by a link 269. A spring 270 stretched between a hook 271 on the lower end of the link 269 and a hook 272 on the rearward edge of the arm 266 holds the pawls 267 and 268 in the position shown with a downwardly extending arm 273 of the pawl 268 in engagement with a stud 274 on the arm 266. The arms 266 and shaft 118 are in turn normally held in the position shown by a spring 275 (Figs. 2$^B$ and 14) stretched between a pin 276 attached to the machine frame and an arm 278 fastened to the shaft, movement of the shaft and arm being limited in one direction by a stud 279 also fastened to the machine frame.

Adjacent each of the arms 266 is an arm 285 loose on the shaft 118 and connected by a link 286 (Figs. 1$^A$ and 1$^B$) to an arm 287 rigid with the arm 196. Each of the arms 285 has formed thereon a shoulder 288 (Figs. 1$^B$, 13 and 14) engaging a stud 289 projecting from the side of the pawl 268. When a key 65 is depressed the link 198 connecting the key and the arm 196 will rock the arms 196 and 287 about the shaft 197 and draw the link 286 forward and rock arm 285 counter-clockwise (Fig. 1$^B$). At the beginning of this forward movement the shoulder 288 will engage the stud 289 and rock the pawls 267 and 268 about their pivots so as to bring the end 293 of the pawl 267 in position to engage a stud 294 (Fig. 14) attached to the arm 258 in axial alignment with the anti-friction roller 257 (Fig. 1$^B$). The portion 291 of the arm 285 then engages the stud 290 on which the pawl 268 is pivoted and continued counter-clockwise movement of the arm 285 and pawl 293 will rock the arms 258 and 263 counter-clockwise as viewed in the Fig. 1$^B$ and this, owing to the shape of the cam slot 256, will also cause counter-clockwise movement of the element 249 and engage the broad tooth pinion 248 with the gears 246 and 247. At the same time arm 254 will, of course, be withdrawn from engagement with the gear 247 and when the driving shaft 52 is turned movement of the gear 246 will be transmitted through the broad tooth pinion 248 to the loose gear 247 and the connection thus afforded results in operation of the ticket printing and issuing mechanism and of the totalizer engaging connections previously mentioned for the desired section of the machine.

The shape of the cam slot 256 in each element 249 is such that it will cooperate with the roller 257 to hold the broad tooth pinion 248 in engagement with the gears 246 and 247 after the operation is completed, so that if the ticket sales call for successive operations of the same section of the machine it is unnecessary to impart an engaging movement to the corresponding element 249 although, of course, the pawl 267 will at each operation be positioned to insure proper positioning of the other parts.

It is clear that this construction makes it necessary to provide some means for disengaging the broad tooth pinion 248 at the beginning of an operation to issue a ticket from a different section of the machine. This function is performed by the pawl 268 and roller 264. When a key is depressed and the pair of pawls 267 and 268 corresponding thereto given the preliminary movement before the arms 266 and shaft 118 are given the rest of their movement, the other four pairs of pawls 267 and 268 will remain in the position shown in Fig. 1$^B$ so that when the arms 266 and shaft 118 are rocked to engage the nose 293 of the pawl 267 corresponding to the key operated with the associated stud 294 the inclined edge 301 of one of the other four pawls will engage the roller 264 for the section last operated and the arms 263 and 258 for that section will be returned to the position shown in Fig. 1$^B$. This will withdraw the broad tooth pinion 248 for that section from engagement with its pair of gears 246 and 247 and disconnect the section from the driving mechanism. It is clear, of course, that at this time the pawl 268 connected to the pawl 267 which is set to effect engagement of a broad tooth pinion 248, will have been swung counter-clockwise (Fig. 1$^B$) far enough to prevent it from engaging the roller 264 so that there will be no interference with the correct counter-clockwise movement of the arms 258 and 263 of the section which to be operated.

The five strips from which tickets are issued may be of different colors and are drawn from rolls (not shown) in the lower part of the machine. From these rolls the strips pass up through chutes 305 (Figs. 1$^A$, 6$^A$ and 6$^B$) to pairs of rollers 306 and 307 (Figs. 1$^A$, 1$^B$ and 14). The rollers 306 are all loosely mounted on a rock shaft 308 and each roller carries a pair of flanges 309 extending part of the way around the periphery of the roller and cooperating with the roller 307 to feed the ticket strip. The rollers 307 are carried by levers 311 pivoted on the rock shaft 212 and having their forward ends projecting through openings 312 (Figs. 6$^A$ and 6$^B$) in the front frame 56. Set screws 313 cooperate with the forward ends of the levers and may be adjusted to regulate the impression.

Attached to the periphery of each roller 306 and between the feeding flanges 309 is a removable type plate 315 (Fig. 14) for printing on the backs of the tickets such invariable matter as is shown in Fig. 21. The rollers 306 each have rigid therewith an elliptical gear 316 (Figs. 1$^B$ and 14) engaging an elliptical gear 317 rigid with the loose gear 247. The relative position of the elliptical gears is such that when the gears 246 and 247 have been coupled together and the shaft 52 begins to turn the movement of the roller 306 will at first be comparatively slow but gradually increases until it is moving at its highest speed while the feeding flanges 309 are in feeding relationship with the impression roller 307. The purpose of this elliptical gear construction is to cause the rollers 306 to perform their function during as short a time as possible thereby giving plenty of time for the rest of the ticket printing and issuing mechanism to do its work.

The type plates 315 are all inked by inking rollers 321 loosely mounted on a rod 322 extending across all five of the rollers 306. Pins 323 through the rod 322 hold the ink rollers against lateral movement along the rod. The rod 322 is held in proper position for the type plates 315 to contact with the inking rollers 321 by arms 326 (Figs. 1^A and 4^A) having notches in their rear edges to receive the rod. The arms 326 are fastened to a rock shaft 327 journalled in the machine frames and having attached to its right end a lever 328 (Fig. 4^A). The lever 328 has a downwardly extending portion 329 held in engagement with an adjustable set screw 330 by a spring 331. When it is desired to re-ink the inking rollers the operator grasps the finger piece 332 and rocks the lever 328 and shaft 327 counter-clockwise (Fig. 4^A) against the tension of the spring 331 far enough to permit lifting the rod 322 out of the notches in the arms 326, after which the rod and the ink rollers thereon may be withdrawn endwise through openings 334 in the machine frames.

After the backs of the tickets have been printed by the rollers 306 and 307 the strip passes on through the chute 305 over a platen 337 which takes an impression on the faces of the tickets from type carried by the inserted accounting or ticket devices, then through a stationary knife 341 where it is severed by operation of a movable knife 342 and lastly to a pair of feeding rollers 343 and 344 which are so constructed and operated that they feed the severed tickets far enough through a chute 345 for the ticket to be grasped by the purchaser.

The platen 337 has formed on its under side a pair of ears 351 (Figs. 1^B, 3 and 7) loosely connected by means of a pin 352 to a pair of arms 353. The arms 353 are rigidly connected by a sleeve 354 loose on a rock shaft 355. A spring 356 stretched between the forward end of the platen and one of the arms 353 holds the platen against stops 357 on the upper edges of the arms 353 and permits the platen to have a slight rocking movement about the pin 352 so that the printing surface of the platen will squarely meet the type carried by the inserted ticket device.

The pin 352 also forms a pivotal connection for a link 361 loosely connected at its lower end to a link 362 pivoted on a stud 363 carried by an element 364. The element 364 is loosely mounted on a rod 365 and is normally held against rotation by set screws 366 cooperating with an arm 367 of the element 364 and adjustable to regulate the impression. The links 361 and 362 form a toggle and to take an impression the toggle for the section being operated is straightened slightly by a pitman 371 (Figs. 1^B, 3 and 14), slotted to straddle the driving shaft 52 and carrying an anti-friction roller 373 (Fig. 3) engaging a cam groove 374 in the side of a disk 375 rigid with the corresponding loose gear 247. The cam groove 374 is so shaped that the toggle is straightened and the impression taken shortly after the rotation of the shaft 52 begins.

The stationary knives 341 (Figs. 1^B and 7) are fastened to a bar 381 extending across the machine and have slots 382 through which the ticket strip passes after it has been printed. The movable knives 342 are connected by pins 383 to the cross plates of yokes 384, the side arms of which are pivoted on rods 385 supported by arms 386 fastened to a rock shaft 387. Springs 388 act against the yokes in such a way as to hold the movable knives 342 in sliding engagement with the stationary knives 341. The shaft 387 has fastened thereto an arm 389 (Figs. 2^B, 7 and 27) to which is pivoted one end of a pitman 390. The other end of the pitman is slotted to straddle the driving shaft 52 and a roller 391 on the side of the pitman engages a cam groove 392 formed in the left hand side of the disk 137 previously mentioned. The cam groove 392 is arranged to rock the shaft 387 at the beginning of the operation so as to withdraw the knives 342 from the slots 382 to permit the ticket strip to pass freely through the slots and the shaft is not rocked back to its original position to sever the tickets until toward the end of the rotation of the shaft 52.

As shown in Figs. 1^B and 7 the rollers 343 and 344 for feeding the tickets out of the machine are in the form of sleeves with cooperating flanges 403 knurled or otherwise roughened to grip the tickets. The rollers 343 are loosely mounted on a shaft 404 journalled in the machine frames while the rollers 344 are fastened to a shaft 405. The shaft 405 is rotatably mounted in the upper end of arms 406 (Fig. 2^B) loosely mounted on the shaft 387. Springs 407 stretched between the lower ends of the arms 406 and studs 408 attached to the machine frames hold the knurled flanges 403 of the rollers 344 in contact with the knurled flanges on the rollers 343. It is clear, therefore, that the shaft 405 and the rollers 344 thereon are capable of the movement necessary to permit the paper to pass between the pairs of flanges 403, the frames of the machine being cut out as shown at 411 (Figs. 4$^B$ and 16) to clear the shaft 405.

The connections for driving the shaft 405 to feed the tickets are shown in Fig. 4$^B$. Attached to the right hand end of the shaft 405 is a pinion 412 meshing with a gear 413 rotatably mounted on a stud 414 attached to the right hand machine frame. Rigid with the gear 413 is an intermittent gear 410 (see also Figs. 7 and 34) having two sets of teeth 415 and two pairs of locking portions 416 and 417 to cooperate respectively with locking portions 418 and 419 on an intermittent gear 420 rotatably mounted on a stud 421. Rigid with the intermittent gear 420 is an elliptical gear 422 meshing with an elliptical gear 423 secured to the driving shaft 52. During the forepart of the rotation of the driving shaft 52 the locking portion 418 of the intermittent gear 420 will be in engagement with one of the locking portions 416 of the second intermittent gear 410 so that the feeding rollers 343 and 344 will be held stationary; but by the time the pair of the elliptical gears 316 and 317 (Fig. 1$^B$) have driven their feeding and printing roller 306 far enough for its flanges 309 to feed the ticket strip into engagement with the rollers 343 and 344, the teeth 424 (Fig. 4$^B$) of the intermittent gear 420 will reach a position to engage one or the other of the sets of teeth 415 of the second intermittent gear and the feeding rollers 343 and 344 will be driven. The arrangement of the pair of elliptical gears 422 and 423 with reference to the pairs of elliptical gears 316 and 317 is such that while the teeth 424 of the intermittent gear 420 are driving the second intermittent gear 410 the rollers 343 and 344 will feed the strip at the same speed as the flanges 309 on the rollers 306. After the teeth 424 have completed their work the locking portion 419 of the intermittent gear 420 will come into engagement with one of the locking portions 417 on the intermittent gear 410 so that rotation of the shaft 405 and the feeding rollers 343 and 344 is arrested. At this time the knives 342 are operated to sever the printed ticket from the strip. A tooth 426 on the intermittent gear 420 then engages one of the notches 427 separating the locking portions 416 and 417 and imparts an added movement to the shaft 405 and the feeding rollers. The purpose of this additional movement is to cause the ticket to extend far enough from the chute 345 for it to be grasped readily by the purchaser.

*Insertable accounting devices.*

In Fig. 19 there is shown in actual size the ticket device to be inserted when it is desired to print and issue 5¢ tickets. The other ticket devices are identically the same in construction except that instead of a type plate 431 to print "5¢" the other devices will have plates arranged to print different amounts.

In addition to the type plates 431, each of the insertable devices includes a set of date printing type wheels or carriers 432 (Figs. 22 to 25 inclusive) rotatably mounted on a rod 433 and manually adjustable to set up the date to be printed. A yoke 434 formed of spring material and having its side plates journalled on a rod 435 engages the underside of the casing and has fingers 436 cooperating with notches in aligning disks 437 rigid with the date printing type carriers 432 to hold the type carriers in the positions to which they are adjusted.

Each of the insertable ticket devices also contains four consecutive number type wheels 441 rotatably mounted on a rod 442. At each operation to print from the inserted device these type wheels are operated to add one to the number previously shown. The mechanism for so operating the type carriers comprises a plate 443 (Figs. 22 and 31) loosely mounted on the rod 442. Pivoted to the side of the plate 443 is a pawl 444. A spring 445 wound around a sleeve 446 concentric to the rod 442 has one of its ends bent around the rod 435 and the other around a stud 447 attached to the side of the pawl 444. The spring 445 is so tensioned as not only to hold the pawl 444 in engagement with the teeth of a ratchet wheel 448 fastened to the sleeve 446 but it also normally holds the plate 443 in the position shown with its tail 449 engaging the rod 435. As shown in Fig. 25 the sleeve 446 has a shoulder 451 engaging a notch in the end of a sleeve 452. Fastened to the sleeve 452 is the units type carrier 441 of the consecutive numbering device. The shoulder and notch connection between the sleeves 446 and 452 is simply for convenience in assembling. A sleeve 453 (Fig. 25) at the other side of the consecutive number type carriers holds said type carriers against lateral movement.

Projecting from the side of the plate 443 is a stud 455 engaging a slot 456 in one arm of a bell crank 457 pivotally mounted on a rod 458. When ticket devices are inserted ready for operation the downwardly extending arms 459 of the bell cranks 457 will be in position to be engaged by pawls 462 (Figs. 1$^B$ and 30) pivoted to the upper arms of bell cranks 463 loosely mounted on the shaft 387. A spring 464 normally holds each pawl 462 in the position shown in Fig. 1$^B$. The lower arm of each bell crank 463 carries a roller 465 engaging a slot in a rearwardly extending arm 466 of one of the elements 249. When a key is depressed and its element 249 rocked as previously described to engage the broad tooth pinion 248 with the companion gears 246 and 247, the bell crank 463 will be turned clockwise (Fig. 1$^B$ and 30) so as to engage the nose of the pawl 462 with the lower end of the arm 459 of the bell crank 457. As explained later on, when the driving mechanism is operated the inserted device will be moved forward slightly to effect engagement of the totalizer therein with driving pinions 469 driven through intermediate gears 531 by the actuators 161 for operating the totalizer. As the device moves forward the spring 464 will rock the pawl 462 to engage it with the rear side 472 (Figs. 30 and 31) of the arm 459 of the bell crank 457. Then when the accounting device is moved rearward to disengage its totalizer from the pinions 469 the bell crank 457 will be rocked counter-clockwise (Fig. 31) or clockwise (Fig. 22) causing clockwise movement (Fig. 31) of the plate 443. During this movement of the plate the pawl 444 will turn the ratchet wheel 448 and the connected units type carrier one division. The pawl 462 will remain in engagement with the rear edge 472 of the arm 459 at the end of the operation, but when the element 249 is rocked by depression of a different key to withdraw the broad tooth pinion 248 from engagement, the bell crank 463 will be rocked counter-clockwise (Figs. 1$^B$ and 30) to disengage the pawl 462 from the arm 459, whereupon the spring 445 will return the plate 443 and pawl 444 to their original positions. It is apparent of course that by this construction the operating connection between the pawl 462 and bell crank 459 is effective to drive the consecutive numbering devices during successive operations to issue tickets from the same section of the machine.

Each of the elements of the consecutive numbering device effects transfers to the next higher order element at the end of each rotation. For this purpose rigid with each of the elements or type carriers 453 is a disk 470 (Figs. 24 and 25) on which is formed a tooth 471. Each of the higher order type carriers has attached to its side a pinion 472 and meshing with the pinions 472 are pinions 473 loosely mounted on the rod 435, the pinion 473 being wide enough also to cooperate with the transfer tooth 471. It is clear that when a tooth 471 is carried into engagement with a pinion 473 the pinion 473 and its higher order type carrier will be turned one division.

A spring operated aligning arm 475 (Figs. 23 and 25) cooperates with a ratchet wheel 476 rigid with the units type carrier 441 to prevent reverse movement of the type carrier and also to prevent overthrow of the type carrier by an operation. The three higher order type carriers 441 are aligned by fingers 477 formed on a yoke 478 made of spring material and having its side arms pivoted on the rod 435, the fingers 477 directly engaging the teeth of the pinions 472 previously mentioned. Tension is given to the fingers 477 because of the engagement of the cross plate 478 of the yoke with the underside of the casing of the device.

The totalizers carried in the ticket devices each includes five adding wheels 481 rotatably mounted on a rod 482 across the forward end of the device. Rigid with each of the wheels 481 is a gear 483 for engaging the pinions 469 (Fig. 1$^B$). These pinions 469, it should be stated here, are driven differentially by the actuators 161 and are also given a planetary movement to effect transfers as will be explained fully a little further along. Rigid with each of the adding wheels 481 is also a transfer disk 485 having a tooth 486 (Figs. 24 and 25) for tripping transfer devices. The adding wheels are all normally locked against movement by bell cranks 488 loosely mounted on the rod 458 and held in engagement with the teeth of the gears 483 by springes 489. The bell cranks 488 are in turn normally locked in engagement with the gears 483 by a plate 492 engaging notches 493 in the upper arms of the bell cranks. The plate 492 has lugs 494 (Fig. 25) at its ends engaging holes 495 formed in the side plates 496 of the device. These lugs are shaped at their edges to conform to the circular shape of the holes 495 so that the lugs are limited to rotative movement in said holes. A spring 497 holds the plate 492 in engagement with the notches 493. Rigid with the plate 492 is an arm 498 projecting upward through the top of the casing of the device. When it is desired to release the adding wheels for rotation this arm can be operated to rock the plate 492 against the tension of the spring 497 to withdraw the plate from engagement with the bell cranks 488. The arm 498 is operated to produce this result by devices, hereinafter described, whenever the device is moved forward into engagement with the actuating pinions 469 and it may also be manually operated to effect the same result when it is desired to clear the totalizer.

The inserted ticket devices are supported by a frame 500 (Figs. 1$^B$, 16, 17 and 18) having rearwardly projecting arms 501 pinned to the shaft 404, the shaft forming a pivot for the frame. Fastened to the top of the frame 500 is a lid 503 (Fig. 15). A lock 504 controls the mechanism hereinafter described whereby raising the lid and frame 500 may be prevented.

Attached to the frame 500 are downwardly extending plates 505 formed with flanges 506 to receive the insertable accounting devices. The plates 505 are provided at their forward edges with slots 508 to receive the projecting ends of the rods 458. When it is desired to change the accounting devices the lid 503 is unlocked and the lid and frame 500 then raised, as hereinafter described, with the shaft 404 as a pivot and the accounting devices are then inserted above the flanges 506 with their rods 458 engaging the slots 508. The frame and lid are then swung to the closed position and locked.

In order to retain the inserted accounting devices in position in the frame 500 there is provided a latching arm 512 for each of the devices, these arms all being fastened to a shaft 513 journalled in downwardly projecting ribs of the frame 500. The arms 512 engage the arms 498, previously mentioned, for rocking the plates 492 to unlock the adding wheels, being held in engagement by springs 514 wound around the rod 513. Fastened to the shaft 513 is a knurled segment 516 projecting through the lid far enough to permit its being manually operated to rock the arms 512 out of engagement with the arms 498 when it is necessary to remove one of the accounting devices. In addition to serving to retain the accounting devices in position in their supporting frames the arms 512 also serve as the operating connection for rocking the plates 492 to free the adding wheels, as when one of the accounting devices is moved forward to engage its totalizer with the actuating pinions 469 the arm 512 will cause the plate 492 to be rocked out of engagement with the locking bell cranks 488.

After the lid and frame 500 have been swung to the closed position it is impossible to operate the segment 516 due to the fact that a rearwardly projecting arm 521 fastened to the shaft 513 then rests against the top of the cross bar 381 and prevents rocking the shaft 513.

When the lid and frame are swung to the closed position the projecting ends of the rods 458 of the inserted devices become engaged with notches 523 in the upper ends of arms 524 fastened to the shaft 355. This shaft is given a rocking movement first counter-clockwise (Figs. 1$^B$ and 2$^B$), and then clockwise by a cam groove 531 (Fig. 33) in a disk 532 (see also Fig. 14) fastened to the driving shaft 52. Projecting into the groove 531 is an anti-friction roller 533 carried by a pitman 534 pivotally connected at its upper end to an arm 535 (Figs. 2$^B$ and 33) fastened to the shaft 355. The shape of the cam groove 531 is such that the shaft is rocked to move both the ticket and grand totalizers into engagement with the pinions 269 at the beginning of the movement of the shaft 52 and this engagement is maintained during approximately two-thirds of the rotation of the driving shaft. While the engagement is so maintained the totalizer in the section being operated and the grand totalizer are driven to add and the mechanism for effecting transfers operated.

The rocking movement imparted to the shaft 404 by opening and closing the lid and frame 500 serves to lock and unlock the manually adjustable segments 153 controlling the actuators. Cooperating with the teeth 541 (Figs. 1$^A$ and 7) in the edges of the segments 153 are locking elements 542 loosely mounted on the shaft 101. For each set of locking elements 542 there is provided a sleeve 543 fastened to the rock shaft 103 and having a rib 544 cooperating with arms formed on the locking element 542. Attached to the right hand end of the shaft 103 is an arm 546 (Figs. 4$^A$ and 4$^B$) connected by a link 547 to an arm 548 fastened to the shaft 404. A spring 549 stretched between the link 547 and a fixed pin 550 on the machine frame raises the frame 500 to give access to the inserted ticket devices when the frame and its lid are unlocked. When the link 547 is drawn forward by the spring 549 the shaft 103 is rocked clockwise (Figs. 1$^A$ and 4$^A$) so that the ribs 544 on the sleeves 543 are turned to the position where they will cooperate with clearances 1551 in the forward edges of the locking elements 542. The locking elements are, therefore, freed so that they will not interfere with the adjustment of the segments 153. When the frame 500 is swung back to closed position the shaft 103 is returned to its original position with the ribs 544 in the path of the arms on the locking elements 542 so that adjustment of the segments 153 is again prevented.

As previously pointed out, the lock 504 normally prevent raising the lid 503 and frame 500 to give access to the inserted accounting devices. When the lock is in effective condition its bolt 551 (Figs. 1$^B$ and 15) is above an arm 552 fastened to a rock shaft 553. Rigid with the arm 552 is a knurled segment 554 projecting through a slot in the lid 503. Attached to the shaft 553 is an arm 555 having notches held in engagement with the shaft 556 by a spring 557 stretched between the arms and the frame 500. When it is desired to raise the lid and frame to expose the inserted devices the lock 504 is operated to withdraw its bolt 551 from engagement with the arm 552 and the segment 554 is then manually operated to rock the shaft 553 to disengage the arm 555 from the shaft 556.

Figure 17:
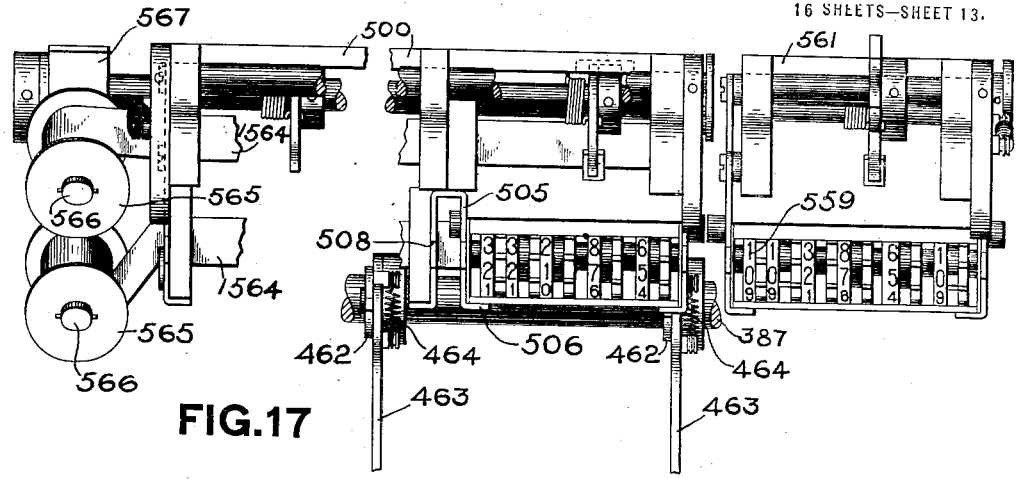
Figs. 17 and 18 are respectively front and top plan views illustrating the construction of the frames for holding the inserted ticket and grand totalizer devices.
Figure 18:
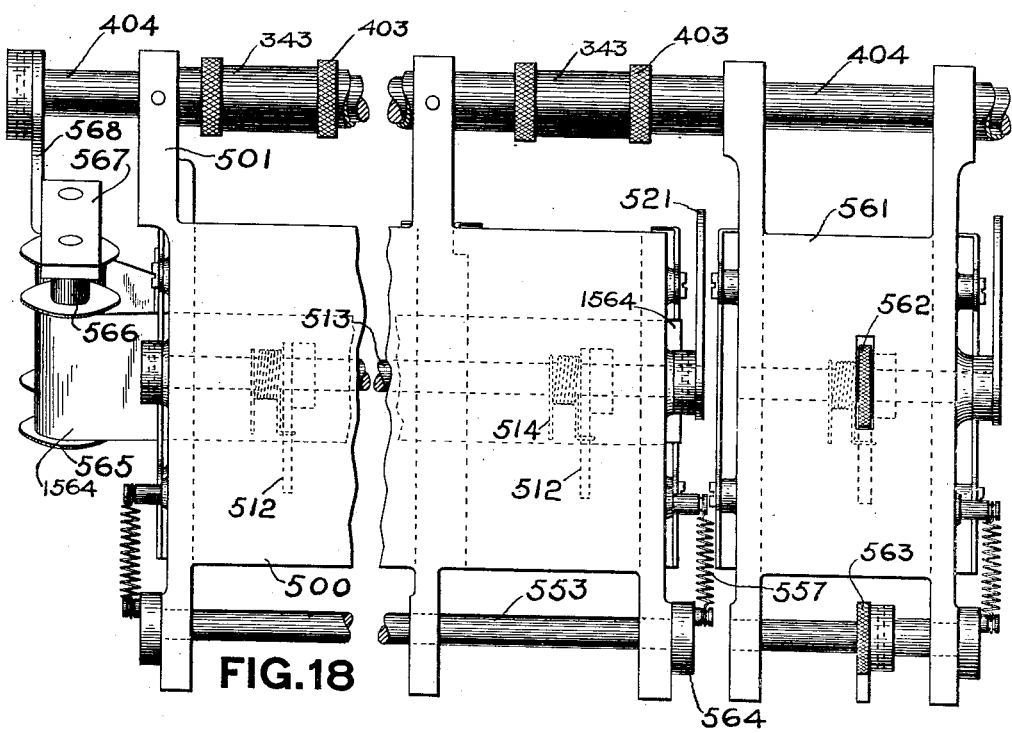

The connections whereby the movement of the actuators 161 is transmitted to the grand totalizer actuators 221 have been described. The grand totalizers are the same in construction as the ticket totalizers except that, as shown at 559 in Fig. 17, they are provided with one more adding wheel. They are carried in devices which are constructed to be inserted and operated in the same way as the ticket devices, but, as previously stated, the devices carrying them have, in this instance, no date wheels, consecutive numbering devices or type carriers for printing the name of the theater and price. When a change in price occurs or when it is desired to keep a record of the total ticket sales for a certain period, one of these grand totalizers is to be inserted and removed at the beginning and end of the period. The operating connections referred to above result in any amount entered on any of the other five inserted devices in the ticket issuing section being also entered on the grand totalizer.

The inserted grand totalizer is carried in a frame 561 (Figs. 2$^B$, 17 and 18). The frame 561 is wholly independent of the frame 500 carrying the inserted ticket devices and is loosely mounted on the shaft 404 so that movement of the frame 561 about the shaft does not affect the locking devices 542 for the manually adjustable segments 153. Knurled segments 562 and 563 are operable respectively to release the inserted grand totalizer for removal and to disengage a latching arm 564 like the latching arm 555 for the frame 500. A lock 560 normally prevents operating the segment 563 in the same way as previously explained in connection with the lock 504 for the ticket totalizer frame 500. It is not necessary to describe the other parts in or associated with the frame 561 as they are the same in every essential as the ones described in connection with the frame 500. The purpose in providing the wholly independent frame 561 for the grand totalizer is to make it possible to inspect or change the grand totalizer without its being necessary to expose the ticket devices or unlock the manually adjustable segments 153.

Ink for printing from the various type carried by the inserted ticket devices is supplied by an ink ribbon 1564 (Figs. 1$^B$, 16, 17 and 18) carried on spools 565 rotatably mounted on studs 566 attached to a plate 567 rigid with an arm 568 fastened to the shaft 404. The ribbon 1564 passes from one spool 565 through slots 569 (Figs. 1$^B$ and 16) formed by the manner in which the plates 505 are shaped and fastened to the frame 500 around the plate 505 of the right hand ticket device (see Figs. 1$^B$ and 18) and across beneath the printing faces of the inserted ticket devices back to the other spool 565. The ribbon does not pass about the frame of the inserted grand totalizer device as no impression is taken from said device and to permit of the independent movement of the frames for the two classes of devices. No mechanism for feeding and reversing the ink ribbon is shown herein as such mechanism is not an essential feature of the present invention. Any one of several of such mechanisms known in the art may readily be applied to the present construtcion.

*Transfer mechanism.*

Cooperating with the inserted ticket totalizers and grand totalizer are sets of transfer devices, the tens and hundreds sections of which involve a planetary movement of the gears 469 (Figs. 1$^A$—1$^B$, 2$^A$ and 2$^B$). The gears 469 are all connected to their actuators 161 by intermediate gears 571 meshing with the teeth of the actuators. The units gear 469 of each set is rotatably mounted on a stud 573 attached to a plate 574 rigidly supported by a shaft 575 and rod 576, the shaft and rod both extending across the machine. The tens and hundreds gears 469 are rotatably mounted in axial alignment with the units gear or plates 577 loosely mounted on the shaft 575 and having slots 578 and 1578 cooperating with the rods 576 and 556 respectively to permit rocking movement of the plate 577 about the shaft 575. The three gears 469 just mentioned, not only transmit movement of the actuators to the totalizer elements in the inserted ticket devices, but the rocking movement of the plates 577 about the shaft 575 also effects transfers as hereinafter explained. For each of the other higher order totalizer wheels there is provided a plate 581 (Fig. 12) which is the same in every respect as the plates 577 except that in place of a gear 469 it has rigidly fastened thereto a toothed transfer element 582.

Pivoted on the shaft 556 is a transfer element 583 (Fig. 12) for each plate 571 and 581, these transfer elements 583 having projections 584 to be engaged by the transfer teeth 486 (Fig. 24) of the inserted totalizer. As a totalizer element passes from nine to zero its transfer tooth will engage the projection 584 and rock the transfer element 583 clockwise (Figs. 1$^B$ and 12) until a roller 585 thereon is carried above a spring operated retaining pawl 586 pivoted to the side of the corresponding plate 577 or 581. When the transfer element 583 has been rocked to this position a spring operated pawl 587 on the element is carried into position to be engaged by a raised portion 588 on a cam 589 fastened to the shaft 575. After time enough has elapsed for the actuators to drive the totalizer wheels the shaft 575 is rocked counter-clockwise (Figs. 1$^B$, 2$^B$ and 12), thereby engaging the cams 589 with the pawls 587 and swinging the transfer elements 583 still further clockwise to the position shown in the figure last mentioned. The roller 585 previously mentioned not only cooperates with the retaining pawl 586 but projects into a slot 593 formed in an upwardly extending arm of the plate 577 or plate 581 and when the transfer element is operated by the cam 589 as just described the stud 585 will cooperate with the slot 593 to rock the plates 577 and 581 clockwise (Figs. 1ᴮ and 12). This movement of the plates 577 will cause the gears 469 to be rotated about the gears 571 and turn the engaged totalizer elements one division, while in the case of the plates 581 the transfer elements 582 will perform a similar function. It is, of course, apparent that because of the planetary movement of the tens and hundreds gears 469 it is not necessary to swing the plates 577 as far as is necessary with the plates 581. For this reason as shown in Figs. 1ᴮ and 2ᴮ the slots 592 and 593 are so shaped that when the transfer elements 583 are operated by the cams 589 the tens and hundreds plates 577 will be given a smaller extent of movement than is given to the plates 581 when the associated elements 583 are operated to carry their studs 585 to the top of the slots 593.

The movement of the shaft 575 to carry the lugs 589 into engagement with the ends of the pawls 587 is an oscillating or rocking movement imparted by a segment 601 (Figs. 4ᴮ and 7) fastened to the shaft 308. Meshing with the teeth of the segment 601 is a pinion 602 fastened to the shaft 575. Attached to the shaft 308 is an arm 603 (Figs. 2ᴮ, 14 and 26) pivotally connected to a pitman 605 slotted to engage the driving shaft 52 and carrying an anti-friction roller 606 engaging a slot 607 in the disk 207. The cam groove 607 is so shaped that after sufficient time has elapsed for the actuators to complete their adding movement the shaft 308 is rocked clockwise (Figs. 2ᴮ and 4ᴮ) with a resulting counter-clockwise movement of the shaft 575 and transfer cams 589 fastened thereto. The pitman 605 then restores all of the mechanism actuated by it to their original positions.

Any of the transfer elements 583 which have been operated are restored by a rod 611 (Figs. 1ᴮ, 2ᴮ, 7 and 12) supported at its ends by arms 612 fastened to the shaft 556. Secured to the shaft 556 is also an arm 614 (Figs. 2ᴮ and 7) connected by a link 615 to the arm 143 (see also Fig. 32) previously mentioned. When the pitman 142 is operated to restore the motor controlling connections as previously described the links 615 will rock the shaft 556 counter-clockwise (Fig. 2ᴮ) so that its rod 611 will engage the upper edges of the transfer elements 583 and swing them back to their original position with their studs 585 at the bottom of the slots 592 and 593. The rod 611 is then swung back to its original position to free the transfer elements 583 ready for the next operation.

Operation

When it is desired to change the machine to print and add new prices the lock 504 (Figs. 1ᴮ and 15) is operated to withdraw the lock bolt 551 from engagement with the arm 552 fastened to the shaft 553. The knurled segment 554 rigid with the arm 552 is then operated to disengage the notches in the arms 564 fastened to the shaft 553 from the shaft 556, thereby permitting the frame 500 and lid 503 to be swung upward with the shaft 404 as a pivot. This movement of the shaft 404 operates through the arm 548 (Fig. 4ᴮ) link 547 (see also Fig. 4ᴬ) and arm 546 to rock the shaft 103 to swing the locking ribs 544 on the collars 543 fastened to the shaft 103 to position the ribs opposite the clearances 1551 in the locking elements 542. This renders the locking elements 542 free on the shaft 101 so that the locking elements 542 no longer cooperate with the notches 541 in the manually adjustable segments 153 to prevent movement of the segments.

The knurled segment 516 projecting through the lid 504 may then be operated to rock the shaft 513 to disengage the locking arms 512 from the arms 498 on the ticket accounting devices already in the machine. The ticket accounting devices may then be withdrawn and the devices for the new prices inserted and latched in inserted position by the arms 512. The segments 153 are then adjusted manually until the indicators 155 thereon reach the position where they display through the opening 156 in the casing the same prices as are carried by the type plates 431 on the devices just inserted. The frame 500 and lid 503 are then swung back to the original or closed position and the segment 554 operated to engage the arms 555 with the shaft 556 and the lock 504 is then operated to project its lock bolt 551 above the arm 552. As the lid and frame are swung back to their original position the shaft 404, arm 548, link 547 and arm 546 rock the shaft 103 back to the position shown, with the locking ribs 544 of the collars 543 in position to prevent movement of the locking elements 542. This prevents any change in the adjustment of the segments 153.

In operating the machine to cause any desired one of the inserted devices to print and add it is necessary only to depress the corresponding key 65. Depression of the key connects the corresponding set of actuators 161 to the driving mechanism and these actuators are then operated to extents determined by the positions of the controlling segments 153. Depression of the key also connects the corresponding feeding and printing roller 306 to the driving mechanism to feed to ticket strip in position to be printed on by the type carried by the selected inserted ticket devices. The mechanism whereby the feeding roller 306 is connected to the driving mechanism has already been described in detail and the description need not be repeated here. It is sufficient now to state that after the feeding roller is once connected to the driving mechanism it remains connected during successive operations until a different key 65 is depressed and operation of the driving mechanism has been begun.

When the frame 500 and lid 503 are swung to the original position the protruding ends of the shaft 458 are engaged with notches in the upper ends of arms 524 fastened to the rock shaft 355. This shaft 355 is rocked at every operation of the machine so that the gears 483 of the totalizers in all of the inserted ticket devices are engaged with the gears 469. However, as only the gears 469 for the set of actuators 161 selected for operation will be driven only one ticket totalizer will be actuated. After the amount has been entered on the selected ticket totalizer by operation of its actuator 161 the ticket devices are all returned to their original position, thereby disengaging the totalizer gears 483 from the gears 469. Before the inserted ticket devices begin to move forward the driving connection between the main driving mechanism and the desired feeding and printing roller 309 is established, as previously described, and as an incident to establishing such a connection the bell crank 463 (Fig. 1$^B$) corresponding to the roller 306 is swung clockwise (Fig. 1$^B$) to carry a spring operated pawl 462 into engagement with the lower end of arm 459 of the consecutive numbering device operating bell crank 457 as shown in Fig. 30. As the inserted ticket devices are moved forward to engage the totalizers with the gears 469 the spring 464 will rock the pawl 462 to engage it with the rear side 472 of the arm 459. Then when the ticket devices are returned to their original position the bell crank 457 will be rocked about its supporting shaft 458 and the plate carrying the consecutive numbering device operating pawl 444 rocked about the rod 432 to actuate the ratchet wheel 448 and the units type wheel 441 of the consecutive numbering device to add "1" on the device. When the ticket devices are returned to their original position the pawl 462 will hold the bell crank 457 in rocked position, thereby establishing a connection which remains established during successive operations to issue tickets from the ticket device until a different key 65 is depressed and the machine operated to cause operation of the feeding roller 309 and totalizer for tickets of a different price. The bell crank 463 for the new price will then be rocked to move its pawl 462 in position to engage the corresponding consecutive numbering device operating bell crank 457 when the ticket devices are moved forward, while the bell crank 463 for the previous price will be positively restored to its original position to withdraw its pawl 462 from engagement with the corresponding consecutive numbering device operating bell crank 457.

At the time that a set of actuators 161 is coupled to the operating mechanism said set of actuators are also connected by means of links 222 to arms 225 fastened to rock shafts 189, 202, and 197. At their right hand ends these shafts carry arms 233, 234 and 235 (Fig. 2$^A$) connected by links 236 to actuators 221 for operating the inserted grand ticket totalizer 559.

While the form of mechanism herein shown and described is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:—

1. In a machine of the class described, the combination of a normally concealed accounting device, means operable to expose the device as desired, mechanism for entering items in the accounting device, manipulative devices controlling the entering mechanism, normally effective locking devices for the manipulative devices, and connections whereby operation of the aforesaid means to expose the accounting device will disable the locking devices.

2. In a machine of the class described, the combination of a totalizer, means normally concealing the totalizer but operable to expose the totalizer, differential mechanism for operating the totalizer, manipulative devices for controlling the differential movements of said mechanism, normally effective locking devices for said manipulative devices, and connections whereby operation of the aforesaid means to expose the totalizer will disable the locking devices.

3. In a machine of the class described, the combination of an accounting device, means normally preventing access to said device, actuating mechanism for the accounting device, manipulative devices operable to control the actuating mechanism, and devices preventing operation of the manipulative devices when the aforesaid means is in normal condition.

4. In a machine of the class described, the combination of an accounting device, means operable to permit or prevent access to said device, mechanism for operating the accounting device, manipulative device controlling said mechanism, devices normally locking the manipulative devices against manipulation, and connections whereby operation of the aforesaid means to permit access to the accounting device will disable the locking devices.

5. In a machine of the class described, the combination of a totalizer, means normally preventing access but operable to permit access to the totalizer, differential mechanism for operating the totalizer, manipulative devices controlling the differential mechanism, devices normally locking the manipulative devices against manipulation, and connections whereby operation of the aforesaid means to gain access to the totalizer will disable the locking devices.

6. In a machine of the class described, the combination of an accounting device, means for rendering the accounting device accessible or inaccessible, differential mechanism for operating the accounting device, devices differentially and manually adjustable to control the operating mechanism, and connections operated by the aforesaid means for preventing adjustment of the adjustable devices when the accounting device is inaccessible.

7. In a machine of the class described, the combination of a totalizer, means operable to prevent or permit access to the totalizer, differential mechanism for operating the totalizer, devices manually and differentially adjustable to control the differential mechanism, and connections operated by the aforesaid means for preventing adjustment of the adjustable devices when the totalizer is inaccessible.

8. In a machine of the class described, the combination of an accounting device, operating mechanism therefor, devices manually and differentially adjustable to control said operating mechanism for one or more operations, a support for the accounting device movable to carry said device into and out of operative relationship with the operating mechanism, and locking devices for the adjustable devices controlled by the aforesaid support.

9. In a machine of the class described, the combination of a main operating mechanism, of an accounting device, means operable manually to carry the accounting device into and out of operative position, manipulative means for determining amounts to be entered in the accomunting device upon repeated operations, and connections whereby operation of the aforesaid means to carry the accounting device into operative positions will prevent manipulation of the manipulative devices, said connections being independent of the main operating mechanism.

10. In a machine of the class described, the combination of a main operating device, an accounting device, operating mechanism for the accounting device, a support for the accounting device movable to carry said device into and out of operative relationship with its operating mechanism, manipulative devices controlling the accounting device operating mechanism, and means controlled by the support for preventing manipulation of the manipulative devices when an accounting device is in operative relationship with its operating mechanism, said preventing means being independent of the main operating device.

11. In a machine of the class described, the combination of a main operating device, a totalizer, operating mechanism therefor, a support for the totalizer manually operable to carry the totalizer into and out of operative relationship with the totalizer operating mechanism, manipulative devices controlling the totalizer operating mechanism, and means controlled by the aforesaid support for preventing manipulation of the manipulative devices when the totalizer is in operative relationship with the operating mechanism, said preventing means being independent of the main operating device.

12. In a machine of the class described, the combination of an insertable accounting device, a movable frame constructed to receive the accounting device, mechanism for operating the accounting device, manipulative devices adjustable to predetermine the extent of movement of the operating mechanism so that its movement shall be uniform for every operation as thus adjusted, locking devices for the manipulative devices, and connections whereby the aforesaid frame controls the locking devices.

13. In a machine of the class described, the combination of a main operating device, insertable totalizers, a movable frame constructed to receive said totalizers, differential mechanism for operating the totalizers, manipulative devices adjustable to predetermine the extent of movement of the differential mechanism so that its movement shall be uniform for every operation as thus adjusted, devices operable to lock and unlock the manipulative devices, and connections whereby said locking devices may be operated by movement of the aforesaid frame, said locking devices being independent of the main operating device.

14. In a machine of the class described, the combination of a main operating device, of an accounting device operating mechanism, a plurality of separately insertable accounting devices, means constructed to receive a device when inserted and movable to carry the device into and out of operative relationship with the operating mechanism, manipulative devices controlling the accounting device operating mechanism, and devices controlled by the aforesaid means for preventing manipulation of the manipulative devices when an inserted device is in operative relationship with the operating mechanism, said preventing means being independent of the main operating device.

15. In a machine of the class described, the combination of a main operating device, of an accounting device operating mechanism, a plurality of separately insertable accounting devices, a frame constructed to receive the inserted accounting devices and manually movable to carry said devices into and out of operative relationship with the operating mechanism, manipulative devices controlling the operations of the accounting device operating mechanism, and means controlled by the movable frame for preventing manipulation of the manipulative devices, said preventing means being independent of the main operating device.

16. In a machine of the class described, the combination of differential mechanism, a plurality of separately insertable accounting devices to be operated by said mechanism, a pivoted frame constructed to receive the devices when inserted, the inserted devices being carried into and out of operative relationship with the differential mechanism by rocking the frame on its pivot, manipulative devices controlling the differential mechanism, and connections whereby rocking the frame on its pivot will lock and unlock the manipulative devices.

17. In a machine of the class described, the combination of differential mechanism, a plurality of detachable accounting devices, means normally holding said devices in operative relationship with the differential mechanism, said means being operable to withdraw said devices as a preliminary to detaching them, manipulative devices controlling the differential mechanism, normally locked locking devices for the manipulative devices, and connections whereby operation of the holding means to withdraw a detachable device unlocks the manipulative devices.

18. In a machine of the class described, the combination of differential mechanism, a plurality of interchangeable accounting devices to be operated by said mechanism, manipulative devices controlling the differential mechanism, and means preventing manipulation of the manipulative devices when any of the accounting devices is in position to be operated.

19. In a machine of the class described, the combination of differentially operable actuators, manipulative devices controlling the actuators, interchangeable totalizers to be operated by the actuators, and means preventing manipulation of the manipulative devices when a totalizer is in position to be operated.

20. In a machine of the class described, the combination of operating mechanism, interchangeable accounting devices to be operated by said mechanism, adjustable stops for controlling the operating mechanism, and means preventing adjustment of the stops when one of said devices is in position to be operated.

21. In a machine of the class described, the combination of differentially movable actuators, manually and differentially adjustable stops for controlling the actuators, interchangeable accounting devices to be operated by the actuators, and means preventing adjustment of the stops when one of said devices is in position to be operated.

22. In a machine of the class described, the combination of accounting device operating mechanism, a plurality of interchangeable accounting devices to be operated by said mechanism, manipulative devices operable to control the operating devices, locking devices normally preventing manipulation of the manipulative devices, and means for disabling the locking devices as an incident to changing the accounting devices.

23. In a machine of the class described, the combination of totalizer actuators, a plurality of interchangeable totalizers to be operated by the actuators, manipulative devices operable to control the actuators, locking devices normally preventing manipulation of the manipulative devices, and means for automatically disabling the locking devices as an incident to changing the totalizers.

24. In a machine of the class described, the combination of totalizer actuators, a plurality of separately insertable totalizers to be operated by said actuators, each of the totalizers to totalize only entries of the same amount, manipulative devices operable to determine the amount to be added by the actuators, and means preventing manipulation of the manipulative devices after a totalizer has been inserted.

25. In a machine of the class described, the combination of totalizer actuators, a plurality of separately insertable totalizers to be operated by said actuators, each of the totalizers to register only entries of one amount, manipulative devices operable to set up the amount to be entered, means normally preventing operation of the manipulative devices, and devices for disabling said means as an incident to withdrawing an inserted totalizer.

26. In a machine of the class described, the combination of a plurality of separately insertable devices each including a data retaining device and price printing type, means for taking impressions from the price type of inserted devices, and means for entering in the data retaining device the amount printed.

27. In a machine of the class described, the combination of a plurality of separately insertable devices each including a data retaining device and price printing type, means for taking impressions from the price type of inserted devices, means for entering in the data retaining devices amounts corresponding to the prices printed, and manipulative devices controlling said entering means.

28. In a machine of the class described, the combination of a plurality of separately insertable devices each including a record retaining device and price printing type, means for taking impressions from the price type of inserted devices, means for entering in the record retaining devices of said inserted devices records of the prices printed, and devices manually adjustable at the time of inserting an insertable device for controlling the record entering means.

29. In a machine of the class described, the combination of totalizer elements, totalizer actuators, a plurality of separately insertable devices each carrying type for printing a different ticket price, stops differentially adjustable at the time of inserting a device to control the actuators to add at each operation an amount corresponding to the price type on said device, and means preventing adjustment of the stops when one of the devices is in position to print.

30. In a machine of the class described, the combination of a plurality of separately insertable devices each including price printing type and a totalizer, means for printing from the type of inserted devices, and means for operating the totalizers to add the amounts printed.

31. In a machine of the class described, the combination of a plurality of separately insertable devices each including a toltalizer and type to print a certain fixed price, means for taking impressions from the type of inserted devices, means for operating the totalizers in said inserted devices to add the amounts printed, and manipulative devices controlling the operating means.

32. In a machine of the class described, the combination of a plurality of separately insertable devices each including a totalizer and type to print a certain fixed price, means for taking impressions from the price type of inserted devices, means for operating the totalizers to add the amounts printed, and manipulative devices opeiable at the time of inserting an insertable device for controlling the operating means.

33. In a machine of the class described, the combination of totalizer actuators, a plurality of separately insertable devices each including a totalizer and type to print a certain fixed price, means for taking impressions from the price type, means for operating the actuators to drive the totalizer of the inserted device, and differentially adjustable stops controlling the actuators, said stops being adjustable at the time of inserting an insertable device.

34. In a machine of the class described, the combination of a plurality of separately insertable devices each including a totalizer and type to print a certain fixed price, means for taking impressions from the price type, means for operating the totalizers in said inserted devices to add the amounts printed, manipulative devices controlling the operating means, and means for locking the manipulative devices in position after manipulation whereby to enter the same amount at each succeeding operation.

35. In a machine of the class described, the combination of a plurality of accounting devices separately insertable into the machine, each of said devices carrying a totalizer and type to print a certain price, totalizer actuators, manipulative devices controlling the actuators and operable to set up the same amount as is represented by the type on an insertable device, and means for locking the manipulative devices against manipulation.

36. In a machine of the class described, the combination of a plurality of accounting devices separately insertable into the machine, each of said devices carrying a totalizer and price printing type, actuators for operating the totalizer of the device inserted, manipulative devices controlling the actuators and operable to cause the actuators to add the same amount as is represented by the type on the inserted device, and means preventing operation of the manipulative devices when an accounting device is inserted.

37. In a machine of the class described, the combination of a totalizer, a plurality of sets of differentially operable totalizer actuators, means adjustable to determine the amount to be added by each set of actuators, devices for retaining said means in adjusted position during successive operations, and means for connecting any desired set of actuators and the totalizer.

38. In a machine of the class described, the combination of a totalizer, a plurality of sets of differentially operable totalizer actuators, means adjustable to determine the amount to be added by each set of actuators, devices for retaining said means in adjusted position during successive operations, a key for each set of actuators, and means whereby operation of a key will connect any desired set of actuators and the totalizer.

39. In a machine of the class described, the combination of a totalizer, a plurality of sets of differentially operable totalizer actuators, manipulative devices movable relative to the actuators to determine the amount to be added by each set of actuators, means for retaining said devices in manipulated position during successive operations, and means for connecting any desired set of actuators and the totalizer.

40. In a machine of the class described, the combination of a totalizer, a plurality of sets of differentially operable totalizer actuators, means adjustable relative to the actuators to determine the amount to be added by each actuator, devices for locking said means in adjusted position during successive operations, and manually operable means for connecting any set of actuators and the totalizer.

41. In a machine of the class described, the combination of a totalizer, a plurality of sets of totalizer actuators, manipulative devices operable to control movements of the actuators, devices for retaining the manipulative devices in manipulated position during successive operations of the actuators, means for selectively operating the sets of actuators, and manipulative devices controlling said means.

42. In a machine of the class described, the combination of a plurality of totalizer actuators, a totalizer common thereto, manipulative devices operable to determine the amount to be added by each set of actuators when the set is operated, mechanism common to the manipulative devices for retaining said devices in manipulated position during successive operations of the actuators, manipulative devices for selecting the set of actuators to be operated, and means controlled by said manipulative selecting devices for connecting the selected set of actuators and the totalizer.

43. In a machine of the class described, the combination of a totalizer, a plurality of sets of totalizer actuators, manipulative devices operable to determine the amount to be added by each set of actuators when the set is operated, mechanism common to the manipulative devices for retaining said devices in manipulated position during successive operations of the actuators, manipulative devices for selecting the set of actuators to be operated, and means whereby manipulation of said selecting devices connects the selected set of actuators and the totalizer.

44. In a machine of the class described, the combination of a plurality of invariably moved driving segments, a companion segment adjacent each of the invariably moved segments, means operable to couple desired companion segments to their driving segments, actuators to be differentially driven by the companion segments, connections for transmitting movements of the companion segments to the actuators, and manipulative devices controlling said connections.

45. In a machine of the class described, the combination of a plurality of invariably moved segments arranged in groups, a companion segment adjacent each of the invariably moved segments, means operable to connect different groups of companion segment to their driving segments, a totalizer actuator to be driven differentially by each of the companion segments, normally effective connections between the companion segments and the actuators, and manipulative devices operable to disable said connections at desired points in the movement of the companion segments.

46. In a machine of the class described, the combination of a plurality of invariably moved segments arranged in groups, a companion segment adjacent each of the invariably moved segments, manipulative means for connecting desired groups of companion segments to their driving segments, a totalizer actuator to be driven differentially by each of the companion segments, normally effective connections between the companion segments and the actuators, devices constructed to be differentially set to control said connections, and means for retaining said devices in set position during successive operations.

47. In a machine of the class described, the combination of a plurality of accounting mechanisms, an operating device common thereto, a manipulative device for each mechanism, and means whereby operation of a manipulative device will connect the corresponding mechanism to the operating device and disconnect the mechanism previously operated from said device.

48. In a machine of the class described, the combination of a plurality of accounting mechanisms, an operating device common thereto, a key for each mechanism, and means whereby operation of a key will connect the corresponding mechanism to the operating device and disconnect the mechanism previously operated from said device.

49. In a machine of the class described, the combination of a plurality of accounting devices, actuating mechanism for each of said devices, an operating device common thereto, a key for each mechanism, and means whereby operation of a key will positively connect the corresponding actuating mechanism to the operating device and positively disconnect the actuating mechanism previously operated from said device.

50. In a machine of the class described, the combination of a plurality of accounting mechanisms, an operating device common thereto, a clutch for each mechanism operable to connect and disconnect its mechanism and the operating device, a key for each of said mechanisms, a rock shaft common to all of the mechanisms, an arm for each mechanism fastened to the rock shaft, two pawls carried by each arm, one to operate the clutch to connect its mechanism and the driving device and the other to operate the clutch to disconnect its mechanism, connections whereby operation of any key rocks the rock shaft, and means whereby the connections control the pawls.

51. A ticket issuing and accounting mechanism comprising a plurality of separately insertable devices each carrying a totalizer, a consecutive numbering device, date printing type wheels and a type carrier for printing the price and other invariable matter, and means in the machine for operating the totalizer and consecutive numbering device and for taking impressions from the type carriers.

52. In a machine of the class described, the combination of a plurality of operating sections each comprising totalizing mechanism, totalizer actuating mechanism and ticket issuing mechanism; of a main operating mechanism and means for selectively connecting any desired one of said sections to said main operating mechanism whereby to actuate all of the elements of the selected section.

53. A machine of the class described, a combination of a plurality of accounting mechanisms, actuating devices for each of said accounting mechanisms, differentially adjustable manipulative means for controlling the movement of said actuating devices, means for rendering said differentially adjustable means inoperative, and a second set of manipulative devices for selecting the accounting mechanism to be operated according to the differential adjustment of said adjustable means.

54. A machine of the class described, a combination of a plurality of accounting mechanisms, actuating devices for each of said accounting mechanisms, differentially adjustable manipulative means for controlling the movement of said actuating devices, means for rendering said differentially adjustable means inoperative, a second set of manipulative devices for selecting the accounting mechanism to be operated, according to the differential adjustment of said adjustable means, and means for disabling said means which renders the adjustable means inoperative.

55. In a machine of the class described, the combination of a plurality of operating sections each comprising adjustable totalizer actuating means and a ticket issuing mechanism, a main operating mechanism, and means for selectively connecting any desired one of said sections to said main operating mechanism to actuate all of the elements of the selected section.

56. In a machine of the class described, the combination of a main operating device, an accounting device operating mechanism, a frame constructed to receive insertable accounting devices and movable to carry said devices into and out of cooperative relationship with the operating mechanism, manipulative devices controlling the operation of the accounting device operating mechanism, and means controlled by the movable frame for preventing manipulation of the manipulative devices, said preventing means being independent of the main operating device.

57. In a machine for operating a detachable accounting device, item entering means adjustable manually, mechanism for carrying an accounting device into and out of operative association with the item entering means, and means under control of the carrying device for preventing a readjustment of the item entering means during successive operations while such association is maintained.

58. In a machine of the class described, the combination of an adjustable differential mechanism, a movable frame constructed to receive an accounting device and to carry the same into and out of cooperative assembled relation with the differential mechanism, and means controlled by the frame for preventing a readjustment of the differential mechanism while said relation is maintained.

59. In a machine of the class described, the combination of a plurality of adjustable amount determining mechanisms, a movable frame adapted to carry totalizers into a position to be operated by their respective amount determining mechanisms during successive operations of the machine, and means controlled by the movable frame for preventing adjustment of said mechanisms while the totalizers are maintained in a position to be operated.

60. In a machine of the class described, the combination of a plurality of item entering means involving mechanisms independently adjustable to set up different amounts, said means being independently operable to register entries of such amounts, and manually operated means for simultaneously locking said item entering means in adjusted condition.

61. In a machine of the class described, the combination of a plurality of adjustable item entering means, a plurality of totalizers, said item entering means and totalizers being relatively positioned for cooperation during successive operations of the item entering means, and means for preventing adjustment of the item entering means while such relative position is maintained.

62. In a machine of the class described, the combination of a plurality of totalizers, independent adjustable item entering means for each totalizer, means for establishing a cooperative relationship between the totalizers and their respective item entering means, and means under control of said second mentioned means for preventing successive entries of different amounts in the same totalizer while such cooperative relationship is maintained.

63. In a machine of the class described, adjustable item entering means, a totalizer, means for normally holding the totalizer and item entering means in operative association during successive operations of the machine, and means under control of said holding means for preventing an adjustment of the item entering means while such association is maintained.

64. In a machine of the class described, the combination of a totalizer, means for entering items therein, said totalizer and item entering means being relatively movable into and out of cooperative relation while the machine is at rest, and means controlled by the movement into cooperative relation for preventing the entry of different items in the totalizer while a cooperative relation is maintained.

In testimony whereof I affix my signature.

HAAKON A. MARTIN.